United States Patent
Wegener et al.

(10) Patent No.: US 11,904,281 B2
(45) Date of Patent: Feb. 20, 2024

(54) SPINNING MEMBRANE SEPARATOR PRIMING SYSTEMS AND METHODS

(71) Applicant: Fenwal, Inc., Lake Zurich, IL (US)

(72) Inventors: Christopher J. Wegener, Libertyville, IL (US); Carolyn Kos, Chicago, IL (US)

(73) Assignee: Fenwal, Inc., Lake Zurich, IL (US)

(*) Notice: Subject to any disclaimer, the term of this patent is extended or adjusted under 35 U.S.C. 154(b) by 0 days.

(21) Appl. No.: 17/573,378

(22) Filed: Jan. 11, 2022

(65) Prior Publication Data

US 2022/0250007 A1 Aug. 11, 2022

Related U.S. Application Data

(60) Provisional application No. 63/148,589, filed on Feb. 11, 2021.

(51) Int. Cl.
| | |
|---|---|
| *B01D 63/16* | (2006.01) |
| *A61M 1/34* | (2006.01) |
| *A61M 1/26* | (2006.01) |
| *B01D 61/20* | (2006.01) |

(52) U.S. Cl.
CPC .......... *B01D 63/16* (2013.01); *B01D 61/20* (2013.01); *B01D 2311/02* (2013.01); *B01D 2311/14* (2013.01); *B01D 2313/10* (2013.01); *B01D 2313/243* (2013.01); *B01D 2313/44* (2013.01); *B01D 2313/90* (2013.01)

(58) Field of Classification Search
CPC .... B01D 63/16; B01D 61/20; B01D 2311/02; B01D 2311/14; B01D 2313/10; B01D 2313/243; B01D 2313/44; B01D 2313/90; B01D 2313/50; B01D 65/08
See application file for complete search history.

(56) References Cited

U.S. PATENT DOCUMENTS

| | | |
|---|---|---|
| 4,670,152 A | 6/1987 | Leonard |
| 5,053,121 A | 10/1991 | Schoendorfer et al. |
| 5,194,145 A | 3/1993 | Schoendorfer |
| 5,766,480 A | 6/1998 | Cosentino et al. |

(Continued)

FOREIGN PATENT DOCUMENTS

| | | |
|---|---|---|
| EP | 3127564 B1 | 12/2018 |
| WO | 9908734 A1 | 2/1999 |

(Continued)

*Primary Examiner* — Pranav N Patel
(74) *Attorney, Agent, or Firm* — Cook Alex Ltd.

(57) ABSTRACT

A priming subsystem of a cell processing system carries out a method for priming a spinning membrane separator having an inlet and first and second outlets. The method includes opening a first selectable junction disposed between a priming fluid container and the inlet to open a path between the priming fluid container and the inlet, operating a first pump coupled to the first outlet to draw priming fluid from the priming fluid container into the spinning membrane separator, and closing the first selectable junction and a second selectable junction coupled to the second outlet after drawing the priming fluid into the spinning membrane separator. The method further includes operating the first pump after the first selectable junction is closed to draw a vacuum, and opening the first selectable junction after drawing the vacuum.

13 Claims, 15 Drawing Sheets

(56) References Cited

U.S. PATENT DOCUMENTS

| | | |
|---|---|---|
| 6,315,751 B1 | 11/2001 | Cosgrove et al. |
| 8,123,947 B2 | 2/2012 | Rohde et al. |
| 8,343,085 B2 | 1/2013 | Toyoda et al. |
| 8,523,799 B2 | 9/2013 | Biesel et al. |
| 8,858,787 B2 | 10/2014 | Muller et al. |
| 9,724,456 B2 | 8/2017 | Muller et al. |
| 9,744,498 B2 | 8/2017 | Wegener |
| 10,576,197 B2 | 3/2020 | Fujiwara et al. |
| 11,478,755 B2 | 10/2022 | Wegener et al. |
| 2004/0219059 A1 | 11/2004 | Barringer et al. |
| 2010/0089837 A1 | 4/2010 | Inoue et al. |
| 2013/0092630 A1 | 4/2013 | Wegener |
| 2013/0341291 A1 | 12/2013 | Wegener et al. |
| 2014/0199680 A1 | 7/2014 | Min et al. |
| 2015/0166957 A1* | 6/2015 | Kusters ............... A61M 1/0272 422/44 |
| 2018/0043084 A1* | 2/2018 | Keaney ................. B01D 63/06 |
| 2019/0351113 A1* | 11/2019 | Min ..................... A61M 1/815 |
| 2020/0390954 A1 | 12/2020 | Rovatti et al. |

FOREIGN PATENT DOCUMENTS

| | | |
|---|---|---|
| WO | 2012125470 A1 | 9/2012 |
| WO | 20150152236 A1 | 10/2015 |

* cited by examiner

SPINNING MEMBRANE SEPARATOR PRIMING SYSTEMS AND METHODS

CROSS-REFERENCE TO RELATED APPLICATIONS

This application claims the benefit of and priority to U.S. Provisional Patent Application Ser. No. 63/148,589, filed Feb. 11, 2021, the contents of which are incorporated by reference herein in their entirety.

TECHNICAL FIELD

The present disclosure is generally directed to spinning membrane separators. More particularly, the present disclosure is directed to priming (sub)systems and methods for systems and methods featuring a spinning membrane separator, such as cell processing systems and methods.

BACKGROUND

A number of well-known therapies are currently practiced in which a targeted cellular blood component (e.g., red blood cells, white blood cells, or platelets) is separated from whole blood and stored for later infusion to a patient. The targeted cell product (e.g., red blood cells, white blood cells, or platelets) may be in a suspension that includes plasma and/or some other supernatant. As such, it is sometimes desirable to "wash" the cellular suspension (typically with a physiologic buffer) to remove the plasma/supernatant, as well as any non-target cellular material, prior to reinfusion.

Systems and methods for cell washing are exemplified by US Pub. Nos. 2013/0341291, 2013/0092630, and 2014/0199680 and U.S. Pat. No. 11,478,755, each of which is incorporated herein by reference. Each of these applications discloses cell washing systems and methods utilizing disposable fluid circuits including a spinning membrane separator, combined with a reusable processing machine. The circuits and machines may differ in that some include syringe pumps and a control cassette interface that cooperates with selectable flow junctions of a flow control cassette to direct flow along paths or pathways in the circuit, while others include peristaltic pumps and pinch valves that act on the tubing of a fluid circuit to direct flow within the fluid circuit.

In all of the aforementioned cell washing systems, the spinning membrane separator is a key component of the cell processing system and method. It is thus important to the efficiency of the cell processing system and method that the spinning membrane separation function efficiently and in a manner that maximizes cell viability. One factor that can affect the efficient operation of spinning membrane separator and cell viability is presence of air in the spinning membrane separator.

Excess air may be found on the annular side of the membrane or the filtrate (or back side) of the membrane. Excess air on the annular side of the membrane may cause air-liquid interfaces and presents opportunities for high shear conditions and foam formation. This can negatively affect both separation efficiency and cell viability if the cells are exposed to the air-liquid interface during separations. Excess air on the filtrate side can exclude membrane surface area. That is, pores directly above the entrapped air effectively "plug", or inhibit or prevent fluid flow, if the bubble point is not reached.

Priming describes the process or method used before the cell processing (e.g., washing) to replace air in the paths or tubing of the fluid circuit with a priming fluid. Different priming methods provide different degrees of excess air removal. Considering the importance of excess air removal (or simply, air removal) to the efficiency of the cell processing equipment, improved priming techniques are continually sought after.

SUMMARY

In a first aspect, a fluid processing system includes a priming subsystem for priming a spinning membrane separator. The priming subsystem includes a priming fluid container in which a priming fluid is disposed, the spinning membrane separator having an inlet, a first outlet, and a second outlet, at least a first selectable junction disposed between the priming fluid container and the inlet of the spinning membrane separator, the first selectable junction configured to open a path between the priming fluid container and the inlet or to block the path between the priming fluid container and the inlet, a first pump coupled to the first outlet of the spinning membrane separator, and at least a second selectable junction coupled to the second outlet of the spinning membrane separator. The priming subsystem also may include a controller coupled to at least the first selectable junction, the first pump, and the second selectable junction. The controller is configured to open the first selectable junction to open the path, to operate the first pump to draw priming fluid from the priming fluid container into the spinning membrane separator, to close the first and second selectable junctions after priming fluid has been drawn into the spinning membrane separator, to operate the first pump after the first selectable junction is closed to draw a vacuum, and to open the first selectable junction after the vacuum has been drawn.

In a second aspect, a method for priming a spinning membrane separator includes opening a first selectable junction disposed between a priming fluid container in which priming fluid is disposed and an inlet of the spinning membrane separator to open a path between the priming fluid container and an inlet of the spinning membrane separator, operating a first pump coupled to a first outlet of the spinning membrane separator to draw priming fluid from the priming fluid container into the spinning membrane separator, and closing the first selectable junction and a second selectable junction coupled to a second outlet of the spinning membrane separator after priming fluid has been drawn into the spinning membrane separator. The method further includes operating the first pump after the first selectable junction is closed to draw a vacuum, and opening the first selectable junction after drawing the vacuum.

DETAILED DESCRIPTION

A more detailed description of the systems and methods in accordance with the present disclosure is set forth below. It should be understood that the description below of specific devices and methods is intended to be exemplary, and not exhaustive of all possible variations or applications. Thus, the scope of the disclosure is not intended to be limiting, and should be understood to encompass all variations or embodiments that would occur to persons of ordinary skill.

In the following description of various embodiments of a priming subsystem and method for use in a processing system, such as a cell processing system, the priming subsystem includes equipment that has multiple uses within the processing system. Consequently, while certain elements may be described as forming or defining the priming subsystem, it is also true that these elements may operate to perform other functions in the protocols carried out by the cell processing system to process (e.g., wash) cell suspensions. However, when used as described herein, these particular elements may provide a new and innovative priming function as well.

Figure 1:
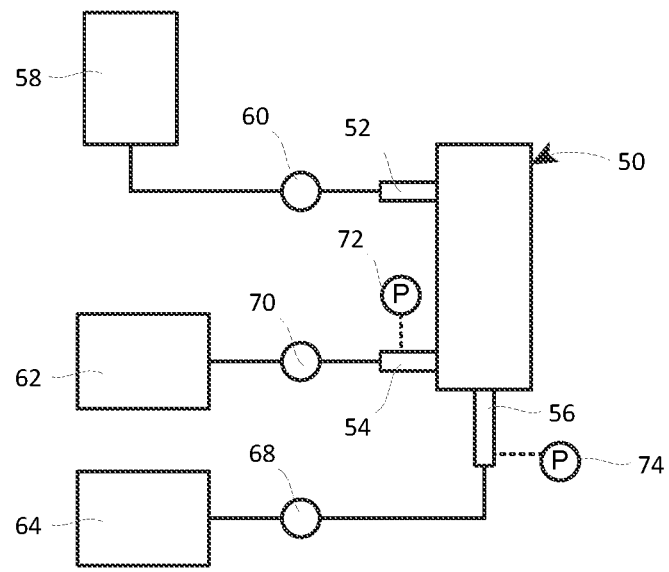
FIG. 1 is a schematic view of an embodiment of a subsystem for priming a spinning membrane separator.
Figure 2:
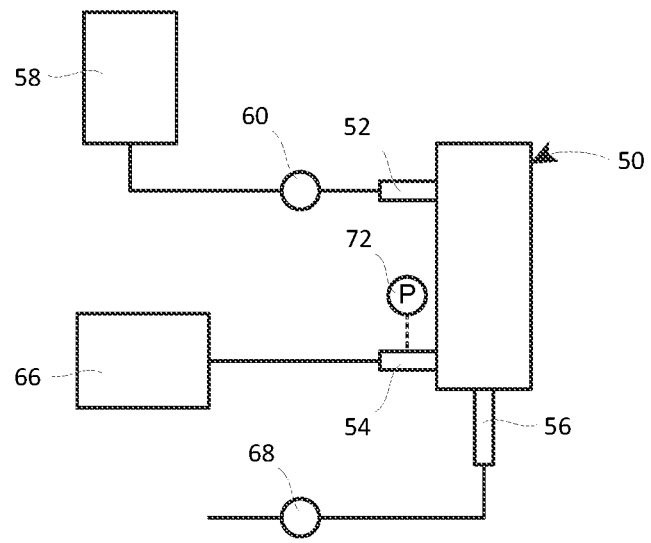
FIG. 2 is a schematic view of an alternate embodiment of a subsystem for priming a spinning membrane separator.

Before turning to particular embodiments of cell processing systems and methods incorporating or including priming subsystems and methods according to the present description, the general concepts of such priming subsystems and methods for a spinning membrane separator are described with reference to FIGS. 1 and 2. The priming subsystem uses a vacuum prime to enhance the removal of air (which also may be referred to as excess air herein) from the separator. In FIG. 1, the priming subsystem is used with a spinning membrane separator to vacuum prime both the annular side of the separator and the back side of the separator, while the FIG. 2 illustrates a priming subsystem used to vacuum prime the annular side of the separator. It is also possible to have a priming subsystem that vacuum primes only the back side of the separator, or for a priming subsystem that is capable of vacuum priming either the annular side or the back side of the spinning membrane separator to be operated to vacuum prime only the annular side or the back side.

In both FIGS. 1 and. 2, the cell processing system includes a spinning membrane separator 50, with inlet 52, first (retentate) outlet 54, and second (filtrate) outlet 56. While the first outlet is the retentate outlet and the second outlet is the filtrate outlet as illustrated, it is also possible to refer to the retentate outlet as the first outlet and the filtrate outlet as the second outlet; the terms "first" and "second" are used for ease of illustration, not to limit "first" and "second" to a particular identification. The particulars of the separator will be explained in detail below, with reference to FIG. 11, but for the immediate discussion such details are not required. Coupled to the inlet 52 is a priming fluid container 58, in which a priming fluid is disposed, the priming fluid being selected, for example, according to the cell suspension to be washed. At least a first selectable junction 60 is disposed between the container 58 and the inlet 52, the junction 60 configured in an open state to open a path or pathway between the container 58 and the inlet 52 or in a closed state to block the path or pathway.

As will be reflected in the embodiments below, the junction 60 may be defined by part of a flow control cassette and in part by a component of the reusable hardware. The junction may include a flexible membrane that is moved relative to two or more ports so that the ports are occluded or opened. Alternatively, the junction 60 may be defined by a line or length of tubing of a fluid circuit and in part by a pinch valve that works against the line to permit flow along the line, or to limit or prevent flow along the line. It will be recognized that other valves or clamps may be used in other embodiments as the junctions described herein.

The embodiment of FIG. 1 of the priming subsystem includes a first pump 62 and a second pump 64, while the embodiment of FIG. 2 includes only a first pump 66. As such, the embodiment of FIG. 1 may be used to vacuum prime both sides of the spinning membrane separator 50, while the embodiment of FIG. 2 may be used to vacuum prime only one side of the separator 50. The pumps 62, 64, 66 may be selected according to the other equipment used in the cell processing system, and may include syringe pumps or peristaltic pumps (whether unidirectional or bidirectional) as a consequence. In fact, it is also within the scope of the present disclosure to have the vacuum prime carried out on a so-called mixed system including syringe pumps and peristaltic pumps (whether unidirectional or bidirectional).

Both embodiments also include at least a second selectable junction 68 that is coupled to the second outlet 56 of the spinning membrane separator 50, while the embodiment of FIG. 1 also may include a third selectable junction 70 that is coupled to the first outlet 54 of the spinning membrane separator 50. The second and third junctions 68, 70 may be as described above relative to the first junction 60. In addition, both embodiments may include a first pressure sensor 72 adjacent the first outlet 54, while the embodiment of FIG. 1 also may include a second pressure sensor 74 that is coupled to the second outlet 56 of the spinning membrane separator 50. In alternate embodiments, the pressure sensors 72, 74, may be omitted where a condition other than the pressure is used as a trigger by the controller, as explained below.

In general terms, both embodiments (FIGS. 1 and 2) operate in the following manner to prime the annular side of the separator 50, under the control of a controller (e.g., a processor and a memory containing instructions which the processor carries out, a hard-wired circuit, or a combination thereof). The junction 60 is opened to open the path or pathway between the container 58 and the inlet 52. The pump 62, 66 may be operated to draw priming fluid from the container 58 into the separator 50, preferable at atmospheric or low vacuum conditions. The junctions 60, 68 may be closed after the priming fluid has been drawn into the separator (junction 68 may have been closed throughout, even as the fluid is being drawn into the separator 50).

After the junction 60 is closed, the vacuum prime begins with the pump 62, 66 operated to draw a vacuum. The vacuum prime may occur immediately after the foregoing atmospheric/low vacuum prime, or the atmospheric/low vacuum prime may occur on both the annular side and the back side of the separator 50, as well as the vacuum prime on the back side of the separator 50, before the vacuum prime is begun. Consequently, it will be understood that while the steps are recited in a particular order for the annular side of the separator 50, it also will be understood that other steps may be performed between the atmospheric/low vacuum prime of the annular side and the vacuum (or high vacuum) prime of the annular side. As the pump 62, 66 is operated to draw a vacuum, the sensor 72 is used to sense the pressure at the outlet 54, by which is it understood to mean that the pressure is sensed at or near the outlet 54 or across or in the spinning membrane separator 50, and when the pressure exceeds a threshold (e.g., is below a particular negative pressure threshold), the junction 60 is again opened.

As mentioned above, the use of a pressure-based trigger to open the junction 60 is but one option. Alternatively, the junction 60 could be opened once a predetermined amount of time has elapsed, at which point it may be inferred from the ordinary operation of the pump(s) that the pressure threshold has been reached. Consequently, it is appropriate to state that the junction 60 is opened after the vacuum has been drawn, or alternatively after a predetermined trigger condition has been met (e.g., a time-based trigger condition).

It is believed that the vacuum conditions created causes the air to increase in volume. When the junction 60 is opened (when the pressure exceeds the threshold), the air and fluid rapidly travel or exhaust out of the separator 50. Because these conditions are believed to improve air removal from the separator 50, it is further believed that this vacuum prime improves the efficiency of the separator in that the removal of the air from the annular side of the separator limits or prevents the formation of air-liquid interfaces and limits or prevents opportunities for high shear conditions and foam formation during post prime use. As to this latter statement, while it is believed that foam formation may occur, and may even be enhanced, during the priming sequence, it is also believed that foam formation will be quite limited, even eliminated, afterward.

In the embodiment of FIG. 1, the additional pump 64 permits the priming subsystem to operate in the following manner to prime the back side of the separator 50 as well, again under the control of a controller (e.g., a processor and a memory containing instructions which the processor carries out, a hard-wired circuit, or a combination thereof). The junction 60 is opened to open the path or pathway between the container 58 and the inlet 52. The pump 64 may be operated to draw priming fluid from the container 58 into the separator 50, preferable at atmospheric or low vacuum conditions. The junctions 60, 70 may be closed after the priming fluid has been drawn into the separator (junction 70 may have been closed throughout, even as the fluid is being drawn into the separator 50).

After the junction 60 is closed, the vacuum prime begins with the pump 64 operated to draw a vacuum. As was mentioned above, the vacuum prime may occur immediately after the foregoing atmospheric/low vacuum prime, or the atmospheric/low vacuum prime may occur on both the annular side and the back side of the separator 50 before the vacuum prime is begun on the back side of the separator 50. Consequently, it will be understood that while the atmospheric/low vacuum prime and the vacuum prime on the back side are recited in a particular order above, it also will be understood that other steps may be performed before or between the atmospheric/low vacuum prime of the back side and the vacuum (or high vacuum) prime of the back side. As the pump 64 is operated to draw a vacuum, the sensor 74 is used to sense the pressure at the outlet 56, by which is it understood to mean that the pressure is sensed at or near the outlet 56, and when the pressure exceeds a threshold, the junction 60 is again opened.

Here as well, the use of a pressure-based trigger to open the junction 60 is but one option. Alternatively, the junction 60 could be opened once a predetermined amount of time has elapsed, at which point it may be inferred from the ordinary operation of the pump(s) that the pressure threshold has been reached. Consequently, it is appropriate to state that the junction 60 is opened after the vacuum has been drawn, or alternatively after a predetermined trigger condition has been met (e.g., a time-based trigger condition).

It is believed that the vacuum conditions created causes the air to increase in volume. When the junction 60 is opened (when the pressure exceeds the threshold), the air and fluid rapidly travel or exhaust out of the separator 50. Because these conditions are believed to improve air removal from the separator 50, it is further believed that this vacuum prime improves the efficiency of the separator in that the removal of the air from the back side of the separator limits or prevents the air from "plugging" or obstructing the pores of the membrane of the spinning membrane separator 50.

In any event, the air that is removed from the separator 50 would be expected, at least in part, to be vented out of the pumps or the lines passing through the pumps either to an external vent or a container (preferably a flexible container) with adequate available volume.

Having thus discussed embodiments of the prime subsystem with reference to FIGS. 1 and 2, the integration of the subsystem is now described with reference to different cell processing systems. In doing so, the embodiments of the cell processing systems featured herein are described first, and then the elements that define the priming subsystem and their operation are identified separate from the remainder of the fluid circuit and reusable hardware.

Figure 3:
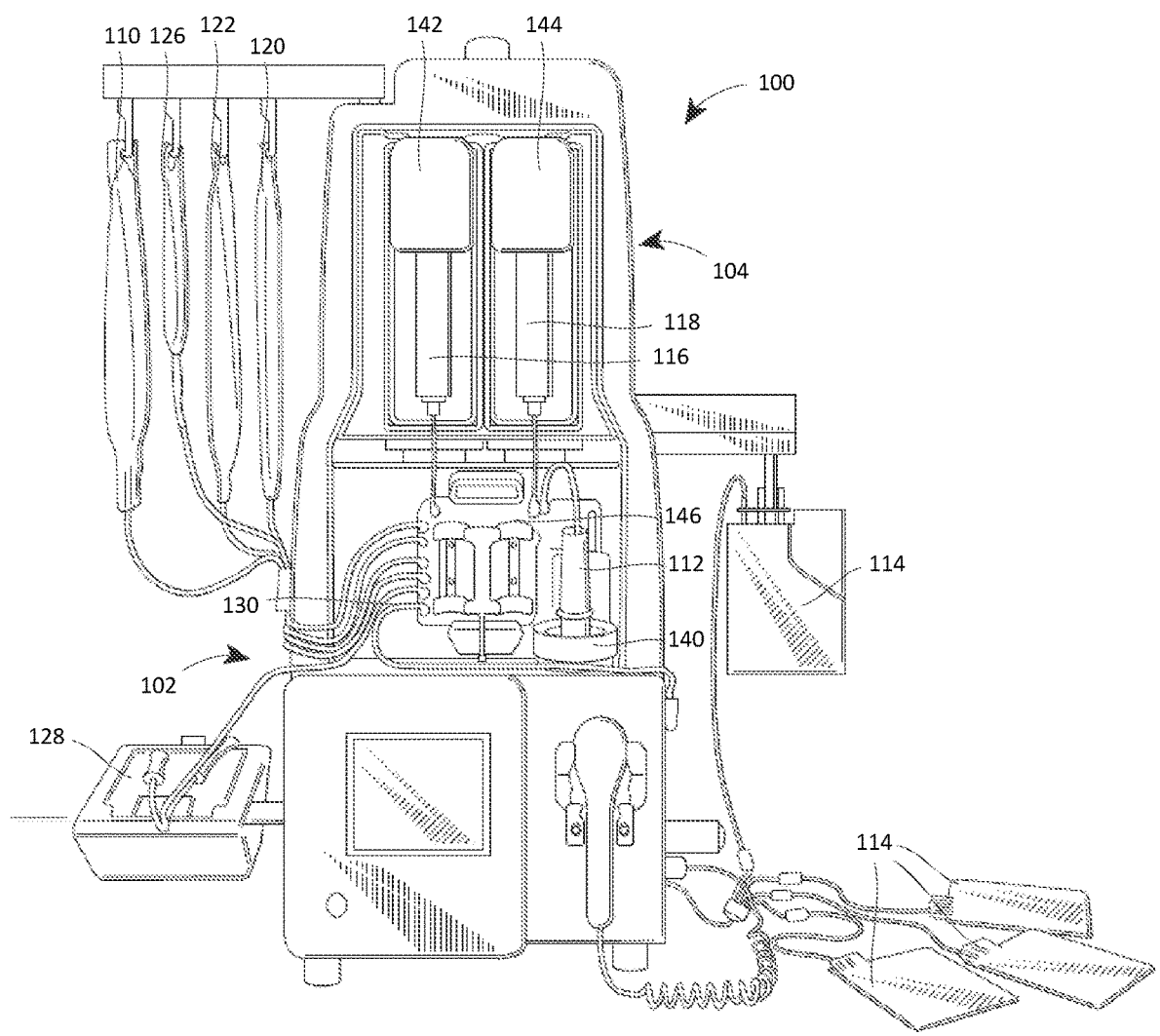
FIG. 3 is a perspective view of a system for processing (e.g., concentrating or washing) small volumes of cellular suspensions including a disposable fluid circuit and a reusable processing machine or hardware, the cell processing system including an embodiment of a priming subsystem according to the present disclosure.

Turning first to FIG. 3, an embodiment of a system 100 for processing fluids, such as cell suspensions (e.g., cell washing), is illustrated, the system 100 including a disposable fluid circuit (also referred to as a set or kit) 102 and a reusable processing machine, or hardware, 104.

Figure 4:
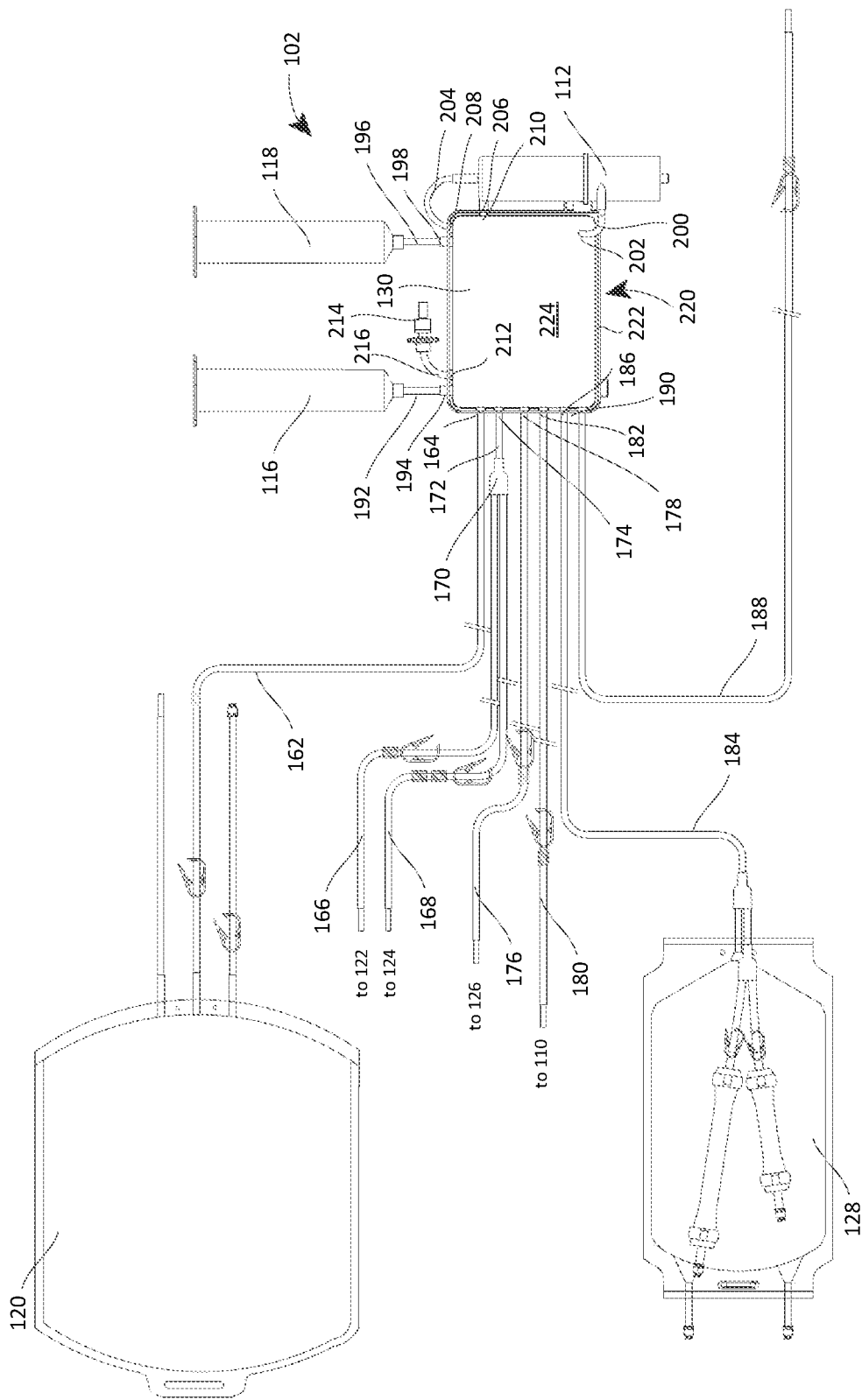
FIG. 4 is a plan view of an embodiment of a disposable fluid circuit for use in the system of FIG. 3.

As seen in FIGS. 3 and 4, the disposable fluid circuit 102 is connectable to a source container 110 of fluid, in particular biological fluid. The disposable fluid circuit 102 includes a spinning membrane separator 112 that is used to process the fluid received from the source container 110, and to direct a portion of that fluid into one of more product containers 114. These containers may be in the form of flexible bags according to the illustrated embodiment. The flow of fluid from the source container 110, through the spinning membrane separator 112, and to the one or more product containers 114 is achieved through the use of first and second syringes 116, 118, which are in fluid communication with the source container 110, the spinning membrane separator (or spinning membrane for short) 112, and the one or more product containers 114. The syringes 116, 118 also may be in fluid communication with a number of other containers 120, 122, 124, 126, 128 (container 124 being schematically represented in FIG. 4 only).

The flow of the fluid between the containers 110, 114, 120, 122, 124, 126, 128, the spinning membrane 112, and the syringes 116, 118 is controlled using a flow control cassette 130, which cassette 130 may be connected to each of the foregoing by tubing, or lines. In addition, the cassette 130 may include internal flow paths that are defined in part by a plurality of separate channels or passages, which in turn may be contained within and may be defined by the structure (e.g., housing) of the cassette 130. The channels may be connected at a plurality of selectable junctions, which may control the flow of fluid from one channel to another. These selectable junctions may also be referred to as valves, valve stations, or clamps, because, as illustrated, the selectable junctions provide controlled access between the channels. The cassette 130 may also include sensor stations, by which sensors may be associated with the flow paths within the cassette 130 to determine characteristics of the flow therein, such as pressure, presence of air and/or fluid, or optical properties. Preferably, the length of each of the lines and channels is kept as short as possible to further minimize the internal volume of the fluid circuit 102.

As illustrated in FIG. 4, the spinning membrane 112 and the syringes 116, 118 may be integrally formed as part of (i.e., as one piece with) the cassette 130, so as to further reduce the tubing volume associated with the kit 14. According to other embodiments, the spinning membrane 112 and/or the syringes 116, 118 may be attached to the remainder of the fluid circuit 102 at the time of use, as may be the case with one or more of the containers 110, 114, 120, 122, 124, 126, 128. Again, as illustrated in FIG. 4, the container 120 and container 128 are integrally formed with the cassette 130.

Figure 5:
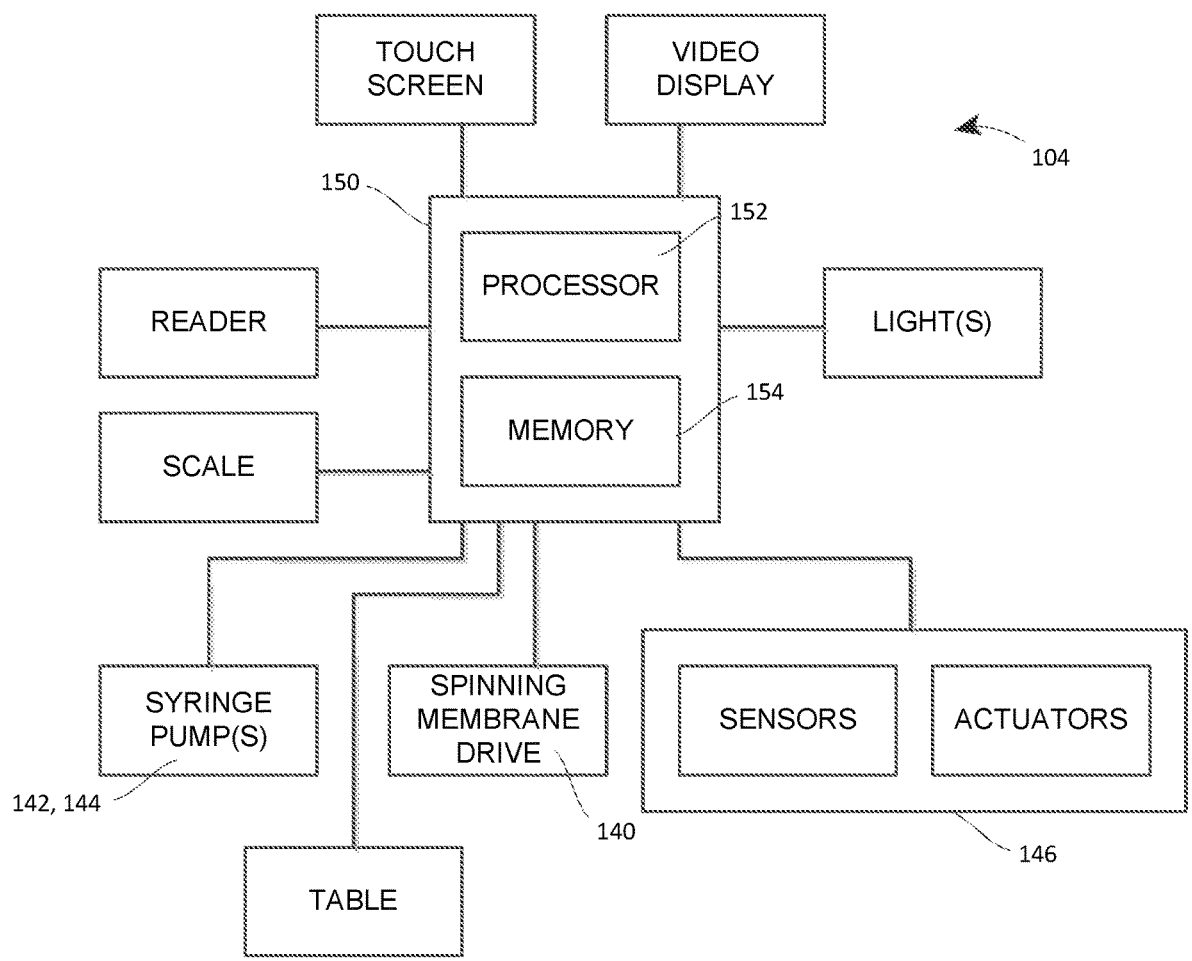
FIG. 5 is a block diagram of an embodiment of the reusable processing machine or hardware of FIG. 3.

As seen in FIGS. 3 and 5, the reusable hardware component (or reusable hardware for short) 104 includes a drive 140 for the spinning membrane separator 112, a syringe pump 142, 144 for each syringe 116, 118, and a control cassette interface 146 that is associated with the flow control cassette 130 when the fluid circuit 102 is disposed on the hardware 104 (e.g., is mounted on the hardware 104). As will be explained in detail below, the cassette interface 146 includes actuators and sensors that are associated with the clamps and sensor stations of the flow control cassette 130, and are configured to operate the clamps or sense characteristics of the fluid, respectively.

The reusable hardware 104 also includes a controller 150 that is configured to control operation of the system 100. The controller 150 may include a microprocessor 152 (which, in fact may include multiple physical and/or virtual processors). According to other embodiments, the controller 150 may include one or more electrical circuits designed to carry out the actions described herein. In fact, the controller 150 may include a microprocessor 152 and other circuits or circuitry. In addition, the controller 150 may include one or more memories 154. The instructions by which the microprocessor 150 is programmed may be stored on the one or more memories 154 associated with the microprocessor 150, which memory/memories 154 may include one or more tangible non-transitory computer readable memories, having computer executable instructions stored thereon, which when executed by the microprocessor 152, may cause the microprocessor 152 to carry out one or more actions as described below.

The controller 150 may be coupled (i.e., directly or indirectly connected) to the equipment of the reusable hardware 104, such as the spinning membrane drive 140, the first syringe pump 142, the second syringe pump 144, and the cassette interface 146. The controller 150 may operate each of these devices, each of which may be an assembly of other devices or equipment, to cause the fluid to flow through the fluid circuit 102 associated with the hardware 104, for example to cause fluid to flow from the source container 110, through the spinning membrane 112, and eventually into the product container(s) 114. For example, the controller 150 may be programmed to perform a process or procedure according to a protocol, such as to wash particular cells contained in the fluid within the source container 110, before they are distributed into one or more of the product containers 114. The controller 150 may be programmed to perform other actions as well, such as to test the fluid circuit 102, to prime the fluid circuit 102, to rinse parts of the circuit 102 after the wash has been performed, to add other components to the cell-containing fluid before that fluid is distributed to the product containers 114, and to distribute the cell-containing fluid into the product containers 114. In addition, the controller 150 may be coupled to other devices and equipment, as is illustrated in FIG. 5 with respect to the unnumbered elements of the Figure.

Having thus described the structure and operation of the system 100, including the fluid circuit 102 and reusable hardware 104, in general terms, the details of each of the systems is now discussed, starting with the fluid circuit 102.

As mentioned above, the flow of fluids through the fluid circuit 102 is controlled through the flow control cassette 130. While other embodiments may involve fluid circuits 102 where some of the fluid does not pass through the cassette 130, according to the embodiment illustrated in FIGS. 3-14, the fluid flows between the containers 110, 114, 120, 122, 124, 126, 128, the spinning membrane 112, and the syringes 116, 118 via the cassette 130. As mentioned above, each of the containers 110, 114, 120, 122, 124, 126, 128, the spinning membrane 112, and the syringes 116, 118 is connected to the cassette through the use of medical grade tubing, or lines.

With reference to FIGS. 3 and 4, the container 120 used to receive the filtrate of the spinning membrane 112 and other fluids is connected via a line 162 to a filtrate container port 164 formed on the cassette 130. The first and second containers 122, 124, used to contain wash media as may be used during the method of operation of the system 100, each may be connected to a line 166, 168 that are connected at a first end to the containers 122, 124, and at a second end to a Y-junction 170. The Y-junction 170 is, in turn, connected via a line 172 to a wash container port 174. The container 126, which may contain a cryopreservation agent (CPA) according to one embodiment, is connected via a line 176 to a port 178. The source container 110 may be connected via a line 180 to a source container port 182. Further, a secondary container 128 is connected via a line 184 to a port 186, and the product container(s) 114 is/are connected via a line 188 to a product container port 190.

As is reflected in the illustrated embodiment, certain of the containers may be formed integrally with the fluid circuit 102, while other containers may be attached at the time of operation. For example, filtrate container 120 and the secondary container 128 are formed integrally with their respective lines 162, 184. On the other hand, lines 166, 168, 176, 180, 188 may be formed with an attachment site (such as an end formed to be sealed to the container or with a connector, such as a luer lock connector, attached thereto) to connect to the containers 110, 122, 124, 126, 114 at the time of use.

The syringe 116 may be connected via a line 192 to a port 194, and the syringe 118 may be connected via a line 196 to a port 198. In a similar fashion, the spinning membrane 112 may be connected at an inlet of the spinning membrane 112 by a line 200 to an inlet port 202, and at a first outlet via a line 204 to a first outlet port 208 and at a second outlet via a line 206 to a second outlet port 210. In addition, an air vent port 212 is provided, and the air vent port 212 is connected to a filter 214 via a line 216. Because of the proximity of the spinning membrane 112, the syringes 116, 118, and the filter 214 to the cassette 130, one or more of the lines 192, 196, 200, 204, 208, 216 may be defined by portions of cassette 130 itself.

Figure 9:
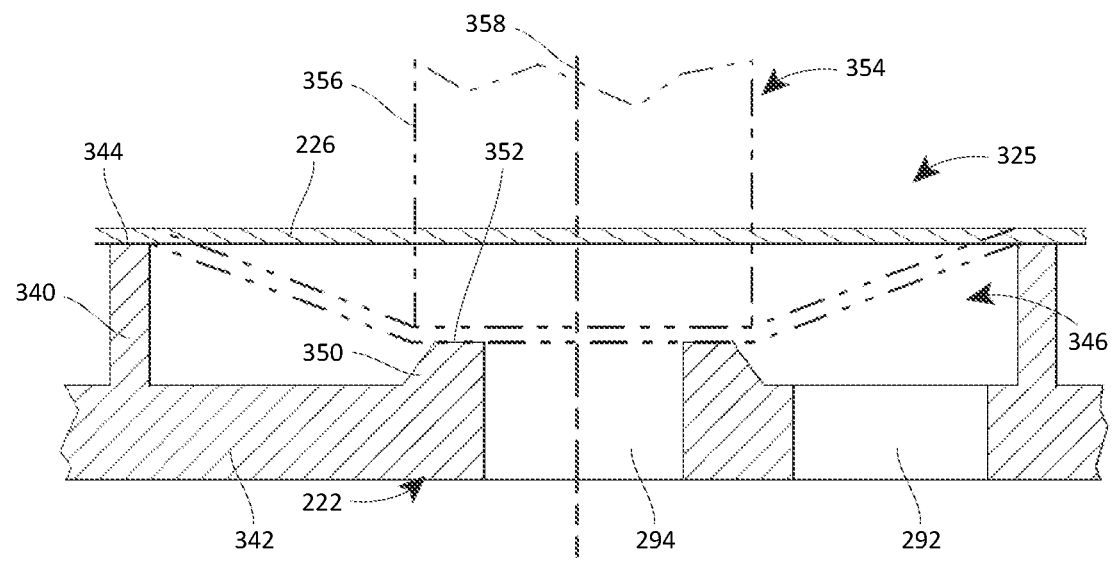
FIG. 9 is a cross-sectional view of one of the clamps of the flow control cassette being manipulated by an actuator.

According to the illustrated embodiment, and as seen in FIGS. 4 and 6-8, the cassette 130 includes a housing 220 defined by a frame 222 to which side walls 224, 226 are attached (see FIGS. 4 and 9). The walls 224, 226 may be attached about the periphery of the frame 222, as well as along structures of the frame that define the channels, clamps, and sensor stations discussed above. The walls 224, 226 may be attached through the use of joining techniques, such as ultrasonic welding, or may be attached by holding the wall 224, 226 and the frame 22 in contact with each other through the application of force.

A negative pressure may be drawn on the side wall 224 of the cassette 130. Drawing a negative pressure on the wall 224 of the cassette 130 is believed to prevent the collapse of the channels defined within the housing 220. This is particularly important in a system that uses syringes 116, 118 and syringe pumps 142, 144 in that the syringe pumps operate, at least in part, by drawing negative pressures within the fluid paths defined, at least in part, by the channels. The application of negative pressure to the wall 224 of the cassette 130 compensates, at least in part, for the negative pressures drawn within the fluid paths.

Figure 6:
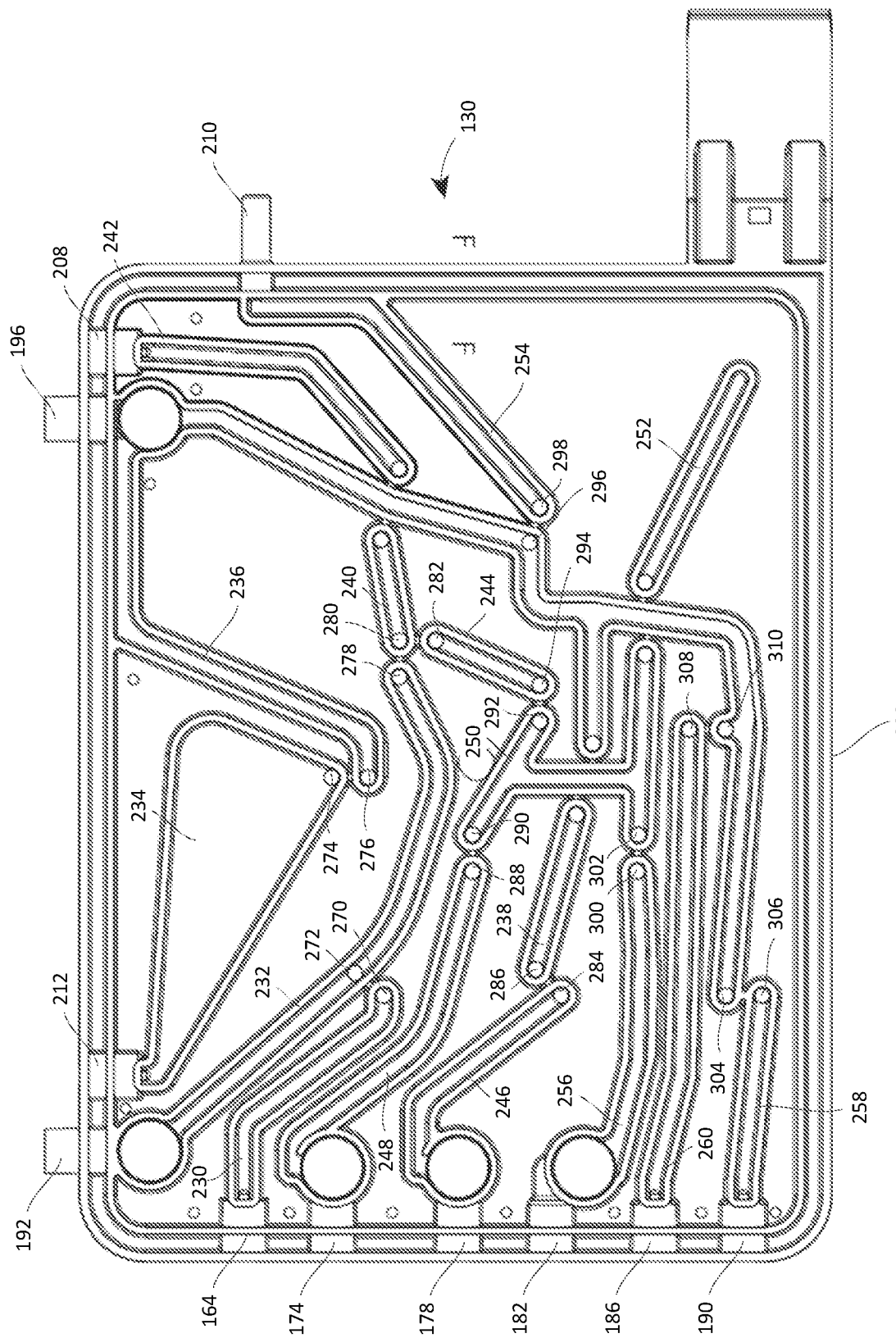
FIG. 6 is a side view of an embodiment of a flow control cassette for use in the disposable fluid circuit of FIG. 4, with one of the sidewalls removed for ease of illustration.

Turning next to FIG. 6, the frame 222 defines the aforementioned plurality of separate and distinct channels, which channels may be connected to one of the ports discussed above. The channels may also have one or more apertures disposed at locations along the lengths of the channel. These apertures may be used to connect the channels, via the clamps or sensor stations, for example, to other channels. Together, the channels may define flow paths (or fluid paths, or fluid flow paths) between the containers 110, 114, 122, 124, 126, 128, syringes 116, 118, and the spinning membrane 112.

Starting at the left-hand side of the cassette 130, a channel 230 is connected to the port 164, and includes an aperture 270. A channel 232 is connected to port 192, and includes apertures 272, 278. A channel 234 is connected to port 212, and includes aperture 274. A channel 236 is connected to port 196, and includes apertures 276, 296, 304, 310. A channel 238 includes an aperture 286, while a channel 240 includes an aperture 280. A channel 242 is connected to port 208, and is connected to channel 240 via a station and unnumbered apertures of channels 240, 242; in a similar fashion, channel 238 is connected to channel 236 via a station and unnumbered apertures of channels 236, 238.

Towards the middle of the cassette 130, a channel 244 includes apertures 282, 294. A channel 246 is attached to port 178, and includes aperture 284. A channel 248 is attached to port 174, and includes aperture 288. A channel 250 includes apertures 290, 292, 302. A channel 252 is connected to the inlet port 202 of the spinning membrane 112, and is connected to the channel 250 via a station and unnumbered apertures of channels 250, 252.

At the right-hand side of the cassette 130, a channel 254 is connected to port 210, and includes aperture 298. On the other hand, at the left-hand side of the page, a channel 256 is connected to port 182 and includes an aperture 300. A channel 258 is connected to port 190, and includes an aperture 306. Finally, a channel 260 is connected to port 186, and includes an aperture 308.

Figure 7:
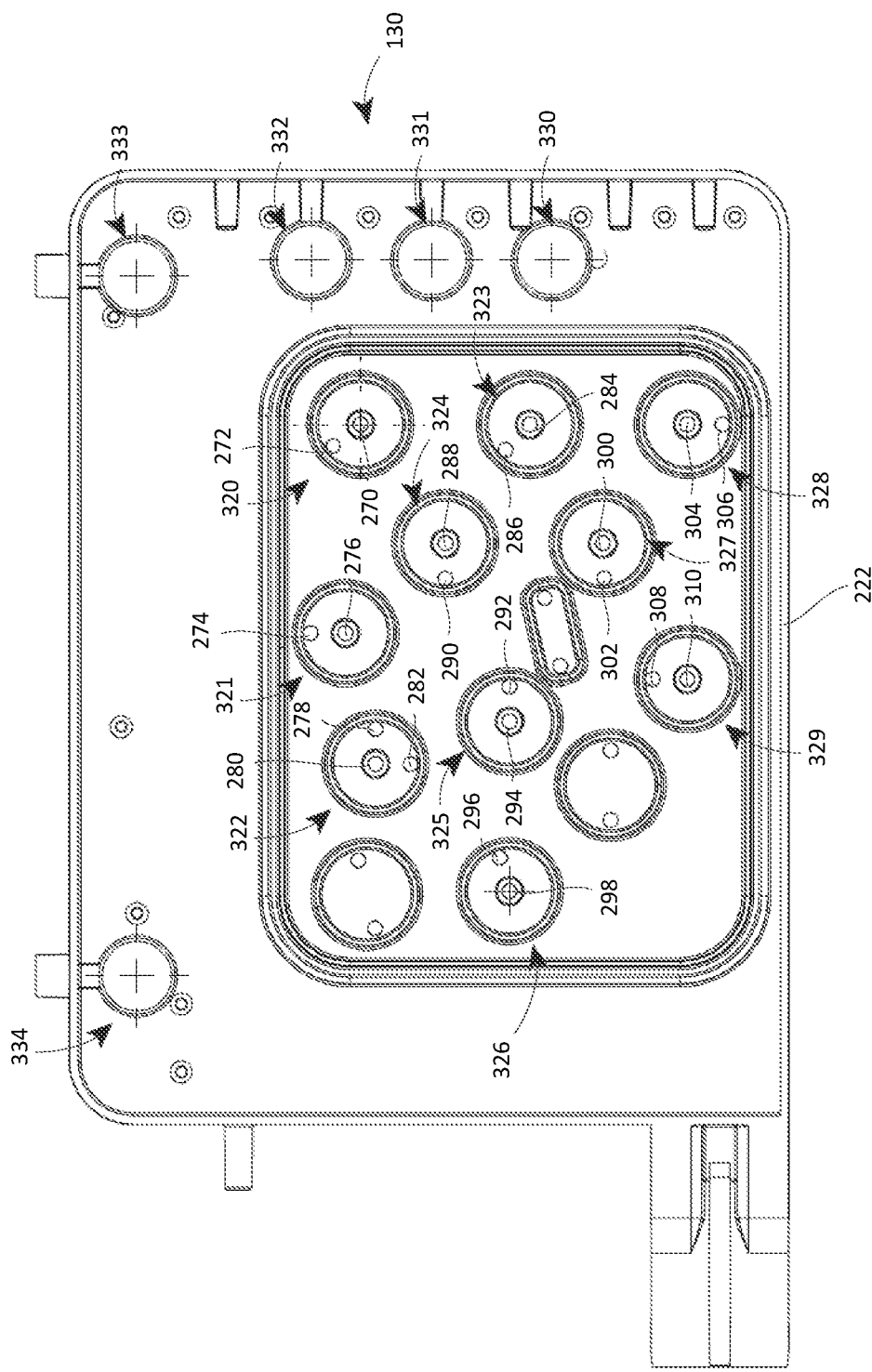
FIG. 7 is a side view of the embodiment of the flow control cassette of FIG. 6, illustrating the opposite side of the flow control cassette.
Figure 8:
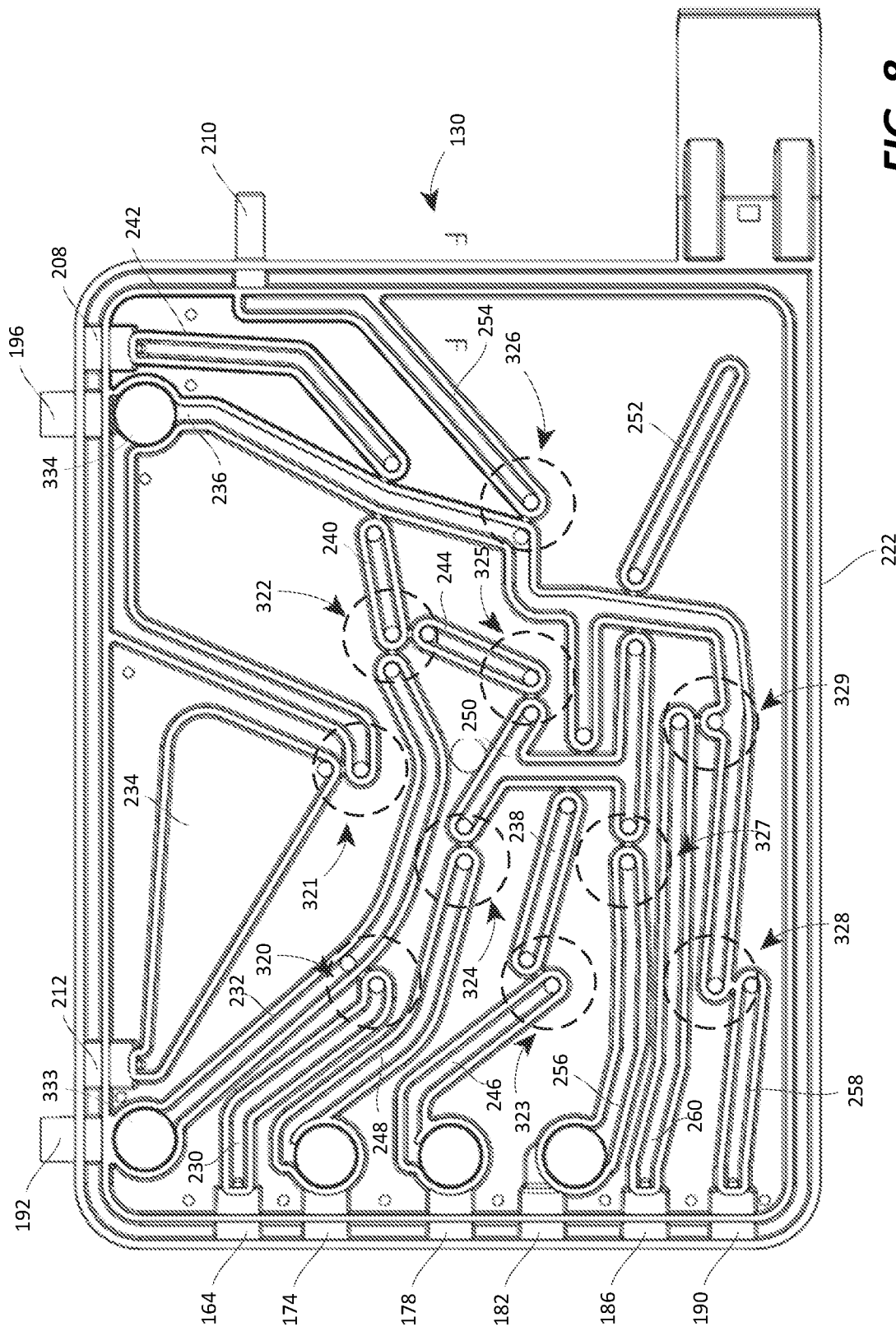
FIG. 8 is a side view of the embodiment of the flow control cassette of FIG. 6, with the location of the selectable junctions, or clamps, from the opposite side of the cassette illustrated relative to the channels and apertures illustrated in FIG. 6.

As seen in FIG. 7, each of the apertures included in the channels 236-260 is associated with one or more of the other apertures. In most instances, each aperture is associated with one of the other apertures; in one instance, three apertures are associated with each other. Each grouping of two or more apertures is associated with a chamber on the reverse side of the cassette 130 from that illustrated in FIG. 6, which chamber then defines one of the clamps.

In particular, apertures 270, 272 are grouped, and define in part a selectable junction or clamp 320, while apertures 274, 276 are grouped, and define in part a clamp 321. The apertures 278, 280, 282 are grouped, and define in part a clamp 322. The apertures 284, 286 define in part a clamp 323, the apertures 288, 290 define in part a clamp 324, the apertures 292, 294 define in part a clamp 325, and the apertures 296, 298 define in part a clamp 326. Finally, the apertures 300, 302 define in part a clamp 327, the apertures 304, 306 define in part a clamp 328, and the apertures 308, 310 define in part a clamp 329. The clamps 320-329 are also shown in dashed line in FIG. 8 with the markings of the apertures removed, for ease of illustration relative to the associations of the clamps 320-329 with the channels 230-260.

As mentioned above, each of the groupings of apertures is associated with a chamber, which chamber and the features thereof further define one of the clamps 320-329. An exemplary clamp (for example, clamp 325) is illustrated in larger scale in FIG. 9 so that the cooperation of the structures of the chamber may be visualized (the structures of the corresponding channels have been omitted for ease of illustration). While the clamp illustrated in FIG. 9 has only two apertures in cross-section, this structure also is applicable to those clamps that have more than two apertures.

The clamp illustrated includes a chamber wall 340 that is formed as part of the frame 222, and extends from a frame wall 342. The chamber wall 240 encloses a circular region as viewed in FIG. 7, and thus may also be described as a circumferential or peripheral wall. The side wall 226, which may be made of a flexible material, is attached to an edge 344 of the chamber wall 340, and with the chamber wall 340 and the frame wall 342 define an enclosed region or space 346. The apertures 292, 294 pass through the frame wall 342, and one of the apertures 294 has a rim or flange 350 disposed about its circumference or periphery. The distance of an edge 352 of the rim 350 from the frame wall 342 is not as great at the distance of the edge 344 from the frame wall 342.

As illustrated in dashed line in FIG. 9, a portion of the wall 226, also referred to as a deflectable surface, may be brought into contact with the edge 352 of the rim 350 to cover the aperture 294 so that fluid cannot flow between the aperture 294 and the volume or space 346. At the same time, the fluid flow between the aperture 292 and the space 346 may remain unobstructed because the deflectable surface does not cover the aperture 292. However, by closing the aperture 294, fluid flow may be interrupted along the fluid path defined by the channels 244, 250 associated with the apertures 294, 292, respectively. The wall 226 may be selectively deflected to abut the rim 350 through the use of an actuator 354 coupled to the controller 150, which actuator 354 may be defined in part by a shaft 356 that moves along an axis 358 (for example, where the shaft 356 is part of an electronic linear actuator). When the shaft 356 is advanced in the direction of the wall 342, the shaft 356 deflects the wall 226 to abut the edge 352 and close the aperture 294. When the shaft 356 is withdrawn away from the wall 342, the wall 226 moves away from the edge 352 and the aperture 294 is open and in fluid communication with the space 346.

Figure 10:
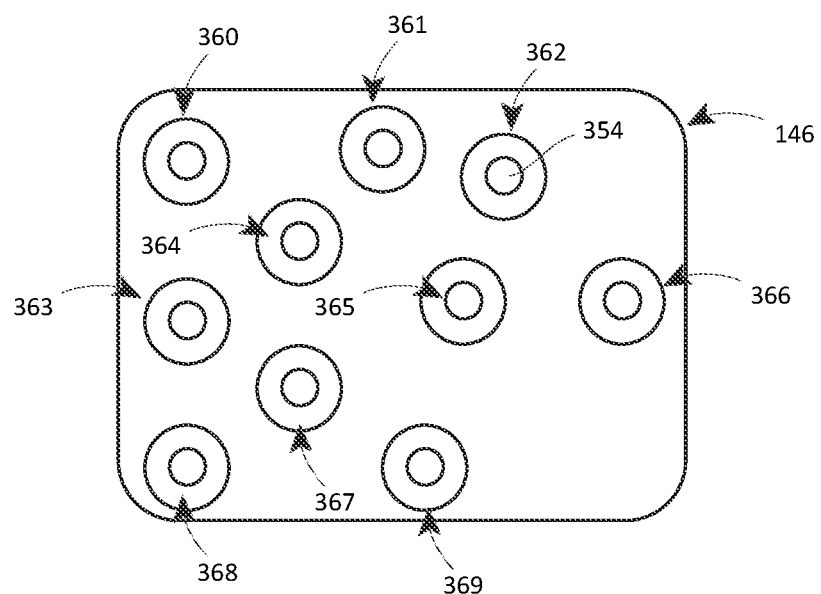
FIG. 10 is a plan view of an embodiment of a flow control interface that is associated with the flow control cassette, and which is configured to operate the selectable junctions, or clamps, of the flow control cassette.

As illustrated in FIG. 10, the cassette interface 146 may include a plurality of actuators 354, each within a space that is intended to be aligned with one of the clamps 320-329. The actuators 354 each may define one of a plurality of actuator stations 360-369 that corresponds to a respective one of the clamps 320-329. Each of the actuators stations 360-369 may be coupled to the controller 150, as illustrated in FIG. 5, and the controller 150 may control the movement of the actuators 354 in the direction of and away from the cassette 130 when the cassette 130 is disposed or mounted on the cassette interface 146. The controller 150 may operate the actuators 354 in conjunction with the desired process.

The cassette 130 may also include a number of air sensor chambers 330-334 disposed at points along the periphery of the frame 222. See FIG. 7. The cassette 130 is to be used with air sensors that are associated with each of the air chambers 330-334 such that it is not necessary that the emitter and detector be disposed on opposite sides of the frame 222. Instead, the emitter and detector can be disposed on the same side of the frame 222, providing so-called single-sided air sensor. This may be beneficial as there is no need to provide a door to close over the cassette 130, the door having either an emitter or a detector mounted thereon, as would be the case with a pass-through sensor where the emitter and detector must be disposed on opposite sides of the cassette 130.

The single-sided air sensors may be in the form of an ultrasonic sensor that emits controlled, timed pulses of ultrasonic energy into the chamber 330-334 and senses the response time of the "echo" of the emitted energy. The echo time is believed to change when the liquid enters the chamber. As an alternative, each of the chambers may have a window that permits an optical sensor to be used therewith, the window being translucent at least to light of a wavelength emitted by a light emitter associated with the sensor. A single-sided (reflectance-based) optical sensor may be used to determine other things than the presence of an air/fluid interface, such as cell concentrations in the fluid as well.

In addition to the cooperation between the cassette 130 and the cassette interface 146, the disposable fluid circuit 102 and the reusable hardware 104 cooperates in other ways as well.

Figure 11:
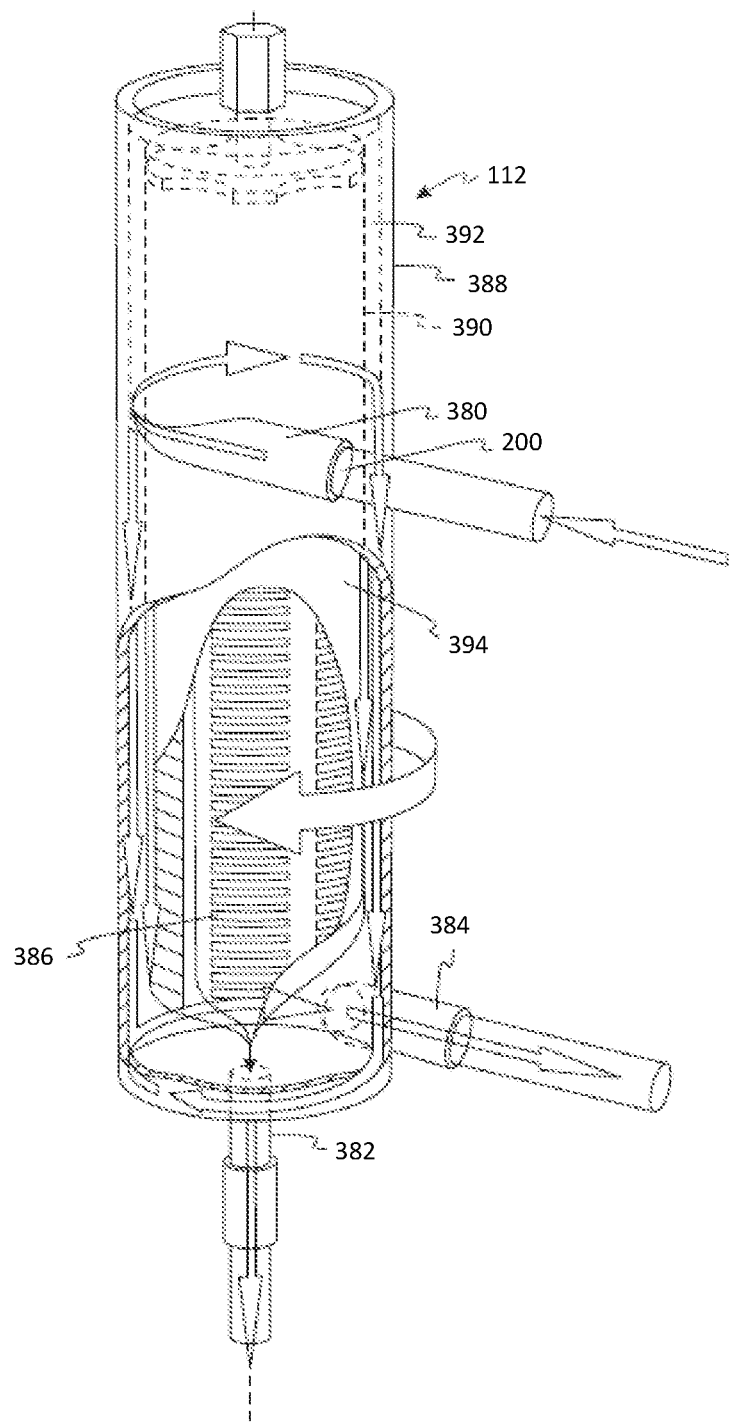
FIG. 11 is a perspective view of a separation/washing device using a spinning membrane.

Turning now to FIG. 11, additional details of the spinning membrane separator 112 may be described. Preferably, spinning membrane 112 is a spinning membrane separator of the type described in U.S. Pat. Nos. 5,053,121, 5,194,145, and 9,744,498, and PCT Pub. No. WO 2012/125470, all of which are incorporated herein by reference in their entirety.

According to the illustrated embodiment, the spinning membrane separator 112 has one inlet port (or inlet) 380 and two outlet ports (or outlets) 382, 384. The outlet 382 of spinning membrane 112 typically receives the waste from the wash (i.e., a non-cellular component of the cellular suspension and wash medium from the spinning membrane separator) and is connected to line 204. The second outlet 384 that is connected to line 206 and typically receives the desired biological cell/fluid product (e.g., washed cells).

The spinning membrane 112 includes an internal member 386 disposed in a generally cylindrical housing 388, The internal member 386 is mounted along a longitudinal central axis of the housing 388, defining an annulus 390 between a surface 392 of the housing 388 and a surface 394 of the internal member 386. The internal member 386 and the housing 388 are relatively rotatable. In a preferred embodiment, as illustrated, the housing 388 is stationary and internal member 386 is a rotary spinner that is rotatable concentrically within cylindrical housing 388, as shown by the thick arrow in FIG. 11.

The inlet 380 is formed in the housing 388 in a fashion that it directs the fluid into the housing 388, and into the annulus 390, in a path tangential to the circumference of the spinner 386 about a first (upper, as viewed in FIG. 11) end of the spinner 386. In turn, the outlet 382 is disposed at a second (bottom, as viewed in FIG. 11) end of the cylindrical housing 388. The other outlet 384 is also disposed near the second end of the housing 388, but along the housing wall instead of at the second end.

The surface 394 of the rotary spinner 386 is at least partially, and is preferably substantially or entirely, covered by a porous cylindrical membrane. The membrane may have a nominal pore size between 0.8 and 10 microns (μm), for example. Membranes may be fibrous mesh membranes, cast membranes, track-etched membranes or other types of membranes that will be known to those of skill in the art. For example, in one embodiment, the membrane may have a polyester mesh (substrate) with nylon particles solidified thereon, thereby creating a tortuous path through which only certain sized components will pass. In an embodiment, the nylon membrane may have a pore size of approximately 0.8 μm and a thickness of approximately 150 μm or greater. Membranes of this type will typically retain all cellular components (e.g., red blood cells, white blood cells) and certain formed blood components, e.g., platelets. In another embodiment, the membrane may be made of a thin (approximately 10 μm thick) sheet of unsupported polycarbonate, for example, with a pore size of approximately 4.0 μm. In this embodiment, pores (holes) may be cylindrical and larger than those described above. The pores may be sized to allow small components (e.g., platelets, microparticles, etc.) to pass, while the desired cells (e.g., white blood cells and larger red blood cells) are collected.

The boundaries of the flow path are generally defined by the annulus, or annular gap, 390 between the interior surface 392 of housing 388 and the exterior surface 394 of the rotary spinner 386. The spacing between the housing 388 and the spinner 386 is sometimes referred to as the shear gap. The shear gap may be approximately 0.02-0.06 inches (0.05-0.15 cm) and may be of a uniform dimension along the longitudinal axis, for example, where the axis of the spinner 386 and housing 388 are coincident as shown. The shear gap 390 may also vary circumferentially for example, where the axis of the housing 388 and spinner 386 are offset.

The shear gap also may vary along the axial direction, for example preferably an increasing gap width in the direction. Such a gap width may range from about 0.02 to about 0.075 inches (0.05-0.19 cm). The gap width could be varied by varying the outer diameter of the spinner 386 and/or the inner diameter of the facing housing surface 392. The gap width could change linearly or stepwise or in some other manner as may be desired. In any event, the width dimension of the gap is preferably selected so that at the desired relative rotational speed, Taylor-Couette flow, such as Taylor vortices, are created in the gap.

Figure 12:
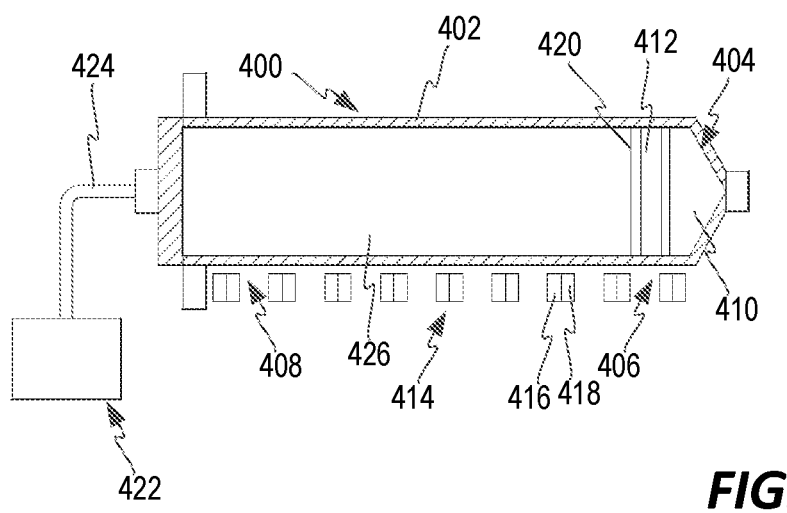
FIG. 12 is a cross-sectional view of an embodiment of a syringe/syringe pump as may be used as part of the system of FIG. 3, with a piston head assembly in a first position.
Figure 13:
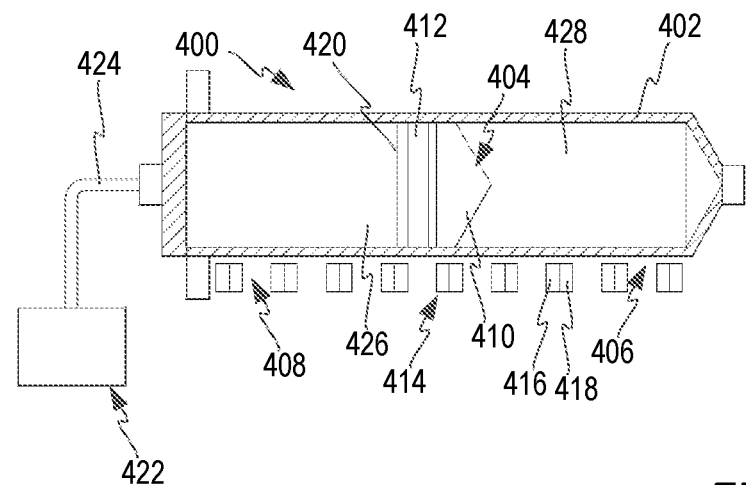
FIG. 13 is a cross-sectional view of the syringe/syringe pump of FIG. 12, with a piston head assembly in a second position.
Figure 14:
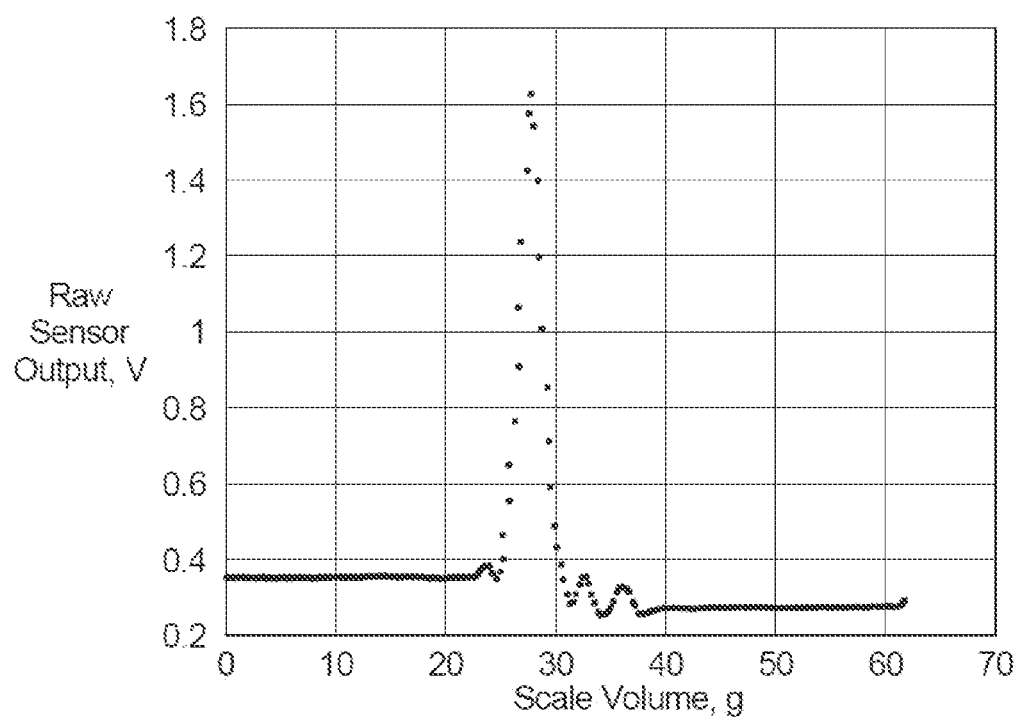
FIG. 14 is a chart of the signal response of one of the infrared detectors or sensors of the syringe/syringe pump of FIG. 12.

FIGS. 12 and 13 illustrate an embodiment of a syringe pump that may be used with either the first or the second syringe 116, 118 and as either the first and/or second syringe pump 142, 144.

The syringe pump is configured for use with a syringe 400 with a syringe barrel 402 (which may be made of cyclic olefin copolymer, or other materials such as may be inert, optically clear) and a piston or plunger head assembly 404. The piston head assembly 404 is moveable (translatable) between a first end 406 and a second end 408 of the barrel 402.

The piston head assembly 404 includes the piston 410 and an infrared reflector 412, which defines one part of a position detector 414. According to the illustrated embodiment, the position detector 414 also includes a plurality of transmitter/sensor pairs 416, 418. According to the illustrated embodiment, the transmitters (or emitters) 416 may be in the form of infrared light emitting diodes, and the sensors 418 may be in the form of infrared sensors. According to other embodiments, the transmitters and sensors may use visible or ultraviolet light, for example. The transmitter/sensor pairs 416, 418 are disposed along the length of the barrel 402 between the first end 406 and the second end 408. The reflector 412 may be in the form of a reflective strip that is disposed about the perimeter of a rigid disc 420 that is attached opposite the piston 410.

In operation, the position detector 414 (which could be coupled to the controller 150, for example) would use the interaction between the transmitter/sensor pairs 416, 418 and the reflector 412 to determine the position of the piston head assembly 404 along the barrel 402. In particular, light emitted from the transmitter 416 would be received by the sensor 418 (or would be received over a threshold amount) if the light contacts the reflector 412. Otherwise, the light would not be received by the sensor 418 (or would not be received below the threshold amount). Depending on the amount of light received by the sensor 418, a signal generated by the sensor 418 would vary. See, e.g., FIG. 14, wherein the signal of the sensor 418 varies as the piston head assembly 404 is drawn to the second end 408, with the sensor signal representative of first air, then piston o-ring, reflector 412 (corresponding to the peak in sensor output), piston, and finally fluid opposite the sensor 418. Depending on the signals received from the individual transmitter/sensor pairs 416, 418, the controller 150 may determine the position of the piston head assembly 404 along the barrel 402 between the first and second ends 406, 408.

A vacuum/pressure source (e.g., a diaphragm pump) 422 is attached via line (e.g., tubing) 424 to the end 408 of the barrel 402. The end 408 is otherwise closed, forming a first variable volume space 426 between the closed end 408 of the barrel 402 and the piston head assembly 404. Filtered air may be pumped into and out of the space 426 to cause the piston head assembly 404 to move between the first and second ends 406, 408 of the barrel 402. The movement of the piston head assembly 404 causes a second variable volume space 428 to open between the piston head assembly 404 and the first end 406 to receive fluid (e.g., a cell product) into the barrel 402. Compare FIGS. 12 and 13. Fluid may be drawn into (or may enter into) and pushed or delivered from the space 428 according to the movement of the piston head assembly 404.

In operation, the piston head assembly 404 starts at a first position, such as is illustrated in FIG. 12. The controller 150 causes the vacuum/pressure source to operate, and draw vacuum behind the piston head assembly 404 (i.e., in space 426). As a consequence, the piston head assembly 404 moves in the direction of the end 408 (i.e., from the end 406 to the end 408) and draws fluid into the space 428 (see FIG. 13). The controller 150 may subsequently operate the vacuum/pressure source to pump pressurized air into the space 426. This causes the piston head assembly 404 to move in the direction of the end 406 (i.e., from the end 408 to the end 406) and push fluid from the space 428.

It will be recognized that the pneumatic control of filtered air in and out of the space 426 provides certain advantages over the use of a syringe with a plunger arm where one end of the barrel remains open to the surrounding environment. By leaving the barrel end open, materials could collect on an inner surface of the barrel wall, such that movement of the piston head between the ends could permit the materials on the inner surface to interact with the fluid on the other (i.e., wet-side) of the piston head. The use of filtered air in the space 426 to move the piston 410 reduces or eliminates this potential source of contaminants. Further, the position detector 414 permits very precise control of the operation of the syringe pump 400. Other embodiments may use a mechanical or electro-mechanical mechanism to move the piston head 410, however.

Having discussed the structure of the illustrated embodiment of the fluid circuit 102 and the corresponding equipment of the reusable hardware 104, the components of the system 100 that define the priming subsystem and their operation is now discussed. It will be recognized that the priming of the fluid circuit 102 will typically be preceded by other actions (e.g., installing the fluid circuit on the reusable hardware, testing the fluid circuit in a series of "dry" checks, attaching containers to the fluid circuit, etc.), which collectively may be referred to as pre-processing actions, in that they occur before the system 100 is used to process (e.g., wash) a cell suspension. Further it will be recognized that the priming of the fluid circuit may be followed by other pre-processing actions and the processing actions that define the protocol to be carried out by the system 100. These actions are discussed in U.S. application Ser. No. 16/541,559, which is incorporated herein by reference.

According to this embodiment, the priming subsystem includes the spinning membrane separator 112 with inlet 380 and outlets 382, 384 (see FIG. 11), and is capable of vacuum priming both the annular side and the back side of the separator 112. The priming fluid container may be defined by one or both of the containers 122, 124 which are connected to the line 172 via the port 174 (see FIGS. 4 and 8). These containers 122, 124 are connected to the inlet 380 of the separator 112 by the channels 248, 250, 252 and the port 202/line 200, with the junction 324 opening or blocking the path or pathway defined by the line 172 and the channels 248, 250, 252 between the containers 122, 124 and the inlet 380. The first pump is defined by the syringe pump 144 and the second pump is defined by the syringe pump 142. The second and third selectable junctions may be defined by junctions 322, 326, respectively. The controller 150 operates as the controller of the vacuum priming subsystem.

The priming may start with the atmospheric/low vacuum priming of the annular side of the separator 112. To do this, the controller 150 may open junctions 324, 326 (remainder closed) and cause the piston of the syringe 118 (via control of the pump 144) to move toward the second end. This draws wash fluid from the container 122, 124 through the port 174 and the channels 248, 250, 252 into the inlet 380 of the spinning membrane 112. The fluid passes through the spinning membrane 112, out of outlet 384 and into port 210, through channels 236, 254, and into the port 196 and syringe 118. This may continue until fluid is detected at the air sensor associated with the air sensor chamber 334 adjacent port 196, at which point any (gross) bubbles may be removed from the flow path (e.g., vented from the cassette 130).

The priming may continue with the atmospheric/low vacuum priming of the back side of the separator 112. To do this, the controller 150 opens junctions 322, 324 (remainder closed) and causes the piston of the syringe 116 (via control of the pump 142) to move toward the second end. This draws wash fluid from the container 122, 124 through the port 174 and the channels 248, 250, 252 into the inlet 380 of the spinning membrane 112. The fluid passes through the spinning membrane 112, out of outlet 382 and into port 208, through channels 232, 240, 242 and into the port 192 and syringe 116. This may continue until fluid is detected at the air sensor associated with the air sensor chamber 333 adjacent port 192, at which point any (gross) bubbles may be removed from the flow path (e.g., vented from the cassette 130).

The priming may further continue with the vacuum priming of the back side of the separator 112. To do this, controller 150 closes junction 324 and causes the piston of the syringe 116 to move toward the second end. This will draw a vacuum at the outlet 382 of the separator 112 via the channels 232, 240, 242. As mentioned previously, the entrapped air will increase in volume under vacuum, making it easier to remove. After a desired vacuum is achieved or exceeded (for example, −8 psid), the junction 324 is opened and air/fluid rapidly travels or is exhausted out of the spinning membrane assembly 112. Once this action is completed, any (fine) bubbles may be removed from the flow path (e.g., vented from the cassette 130).

The priming may also include the vacuum priming of the annular side of the separator 112. To do this, controller 150 closes junctions 322, 324, opens junction 326 and causes the piston of the syringe 118 to move toward the second end. This will draw a vacuum at the outlet 384 of the separator 112 via the channels 236, 254. As mentioned previously, the entrapped air will increase in volume under vacuum, making it easier to remove. After a desired vacuum is achieved or exceeded (for example, −8 psid), the junction 324 is opened and air/fluid rapidly travels or is exhausted out of the spinning membrane assembly 112. Once this action is completed, any (fine) bubbles may be removed from the flow path (e.g., vented from the cassette 130).

The priming of the fluid circuit may continue with the fluid in the syringe 118 being used to prime the path between the syringe pump 144 and the vent port 212 by closing all clamps except 321. In a similar fashion, the fluid drawn into the first syringe 116 may be used to prime the fluid path to the source container 110. This priming step removes air from the line 180 such that the system 100 is ready to begin processing cells.

While the vacuum prime has been described in combination with an atmospheric/low vacuum prime in the foregoing passage, it will be recognized that the steps of the vacuum prime may be performed, either on the annular side or the back side, at any time during the operation of the system 100 when it is determined that excess air should be removed from the spinning membrane separator 112. At such time, the steps of the vacuum prime may be performed as described above, with the subsequent removal of any bubbles from the flow paths as may be desired.

Having thus described the vacuum priming subsystem and operation relative to a first system 100, the vacuum priming subsystem and operation is now discussed relative to a second system 500. The system 500 differs from the system 100 as to structure and operation, and also differs from system 100 in that the vacuum priming subsystem does not provide for both annular and back side priming of the spinning membrane separator.

Figure 15:
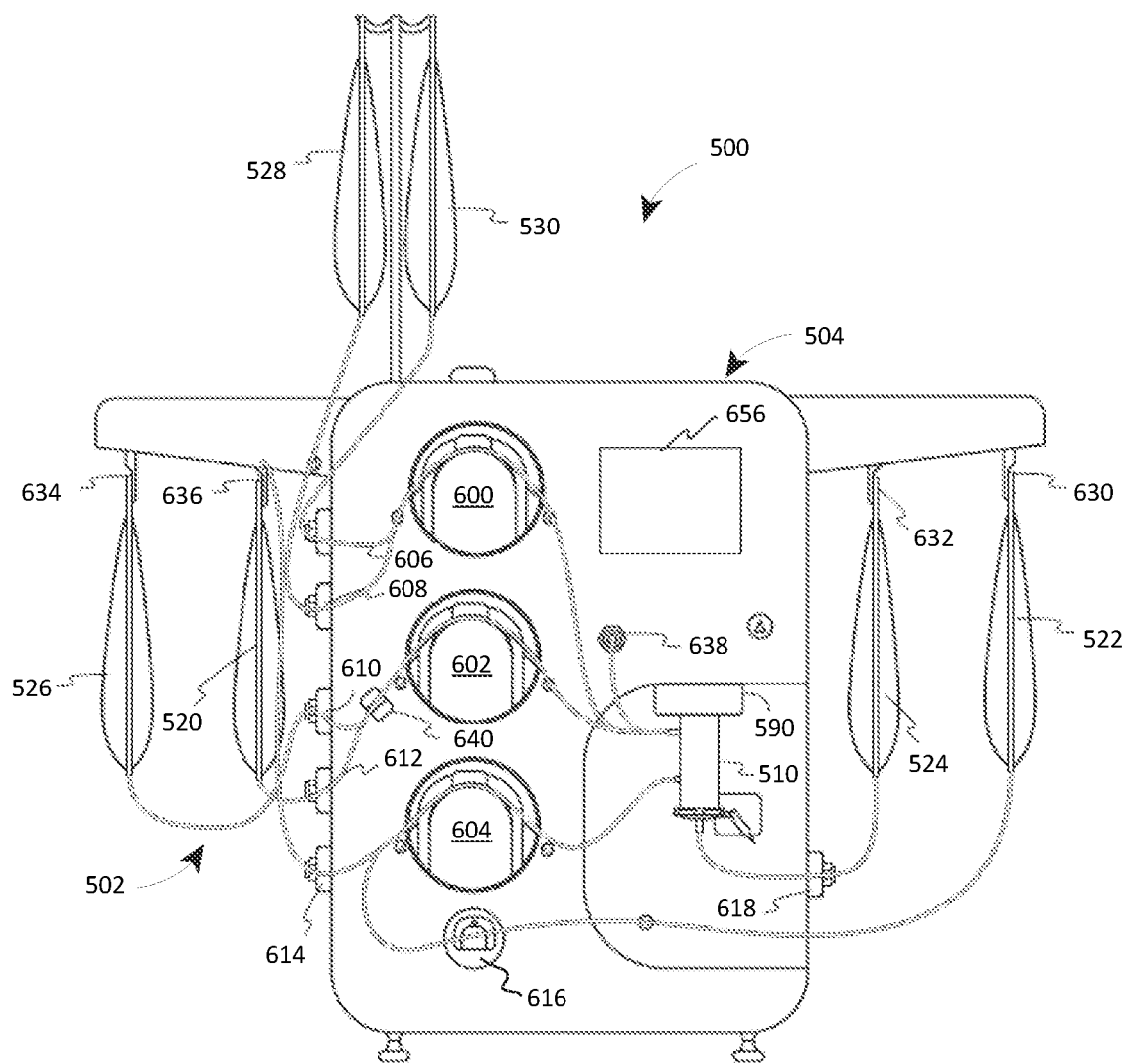
FIG. 15 is a frontal view of a reusable cell processing apparatus with a disposable fluid circuit loaded thereon, including an embodiment of a priming subsystem according to the present disclosure.
Figure 16:
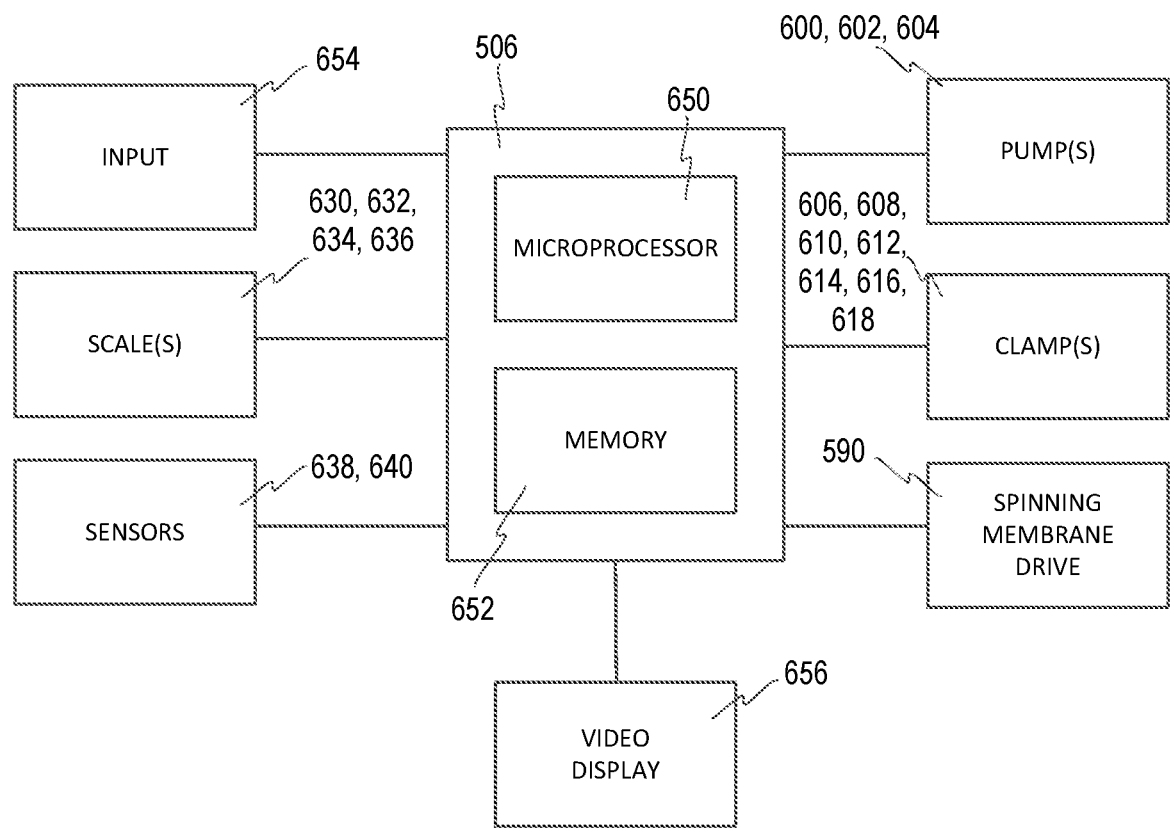
FIG. 16 is a schematic view of the control circuitry of the apparatus of FIG. 15.

As illustrated in FIGS. 15 and 16, a cell processing system 500 includes a processor 502, 504 to receive a biological fluid to be processed, and a control unit (or controller) 506 coupled to the processor, the controller 506 configured to operate the processor 502, 504.

Figure 17:
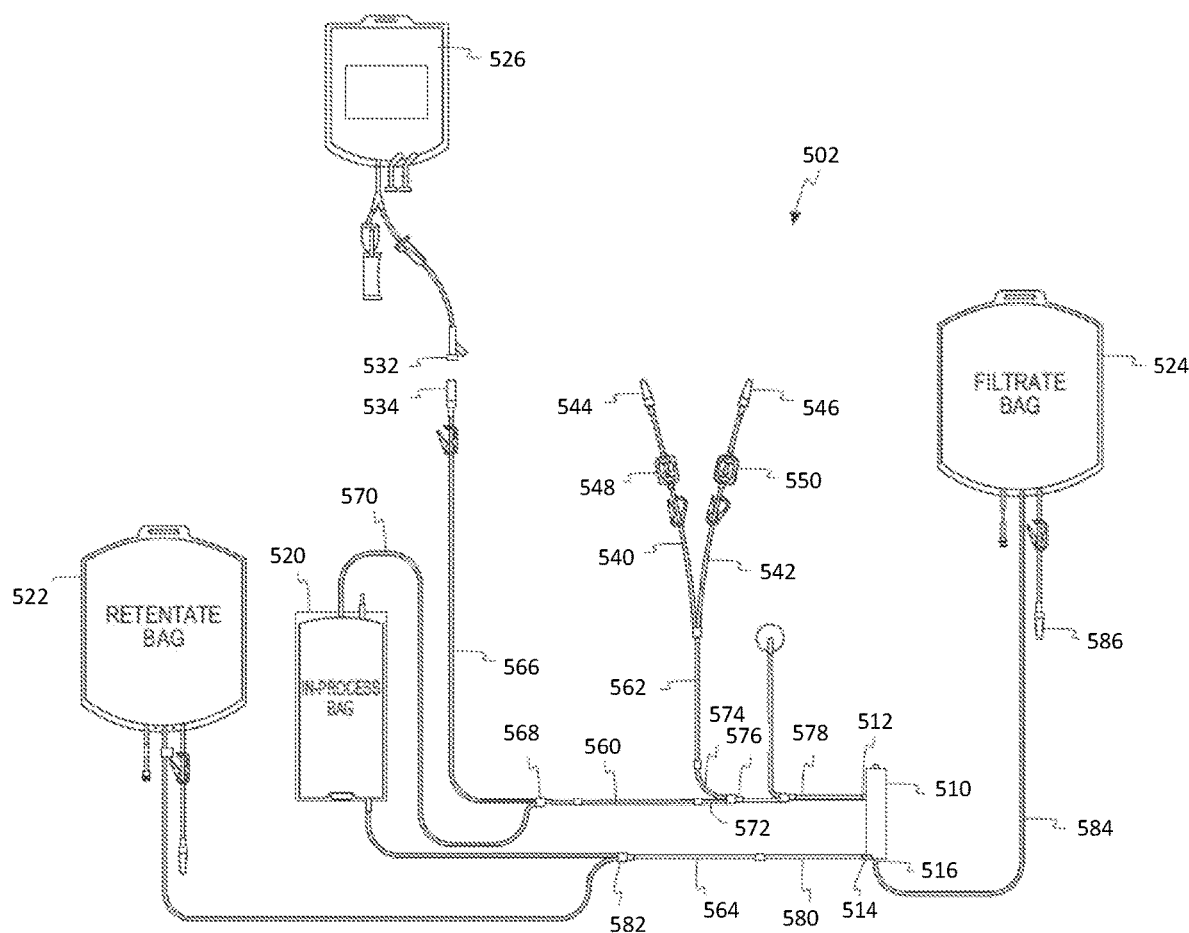
FIG. 17 is a schematic view of one embodiment of a disposable fluid circuit useful in the systems and methods of FIG. 15.
Figure 18:
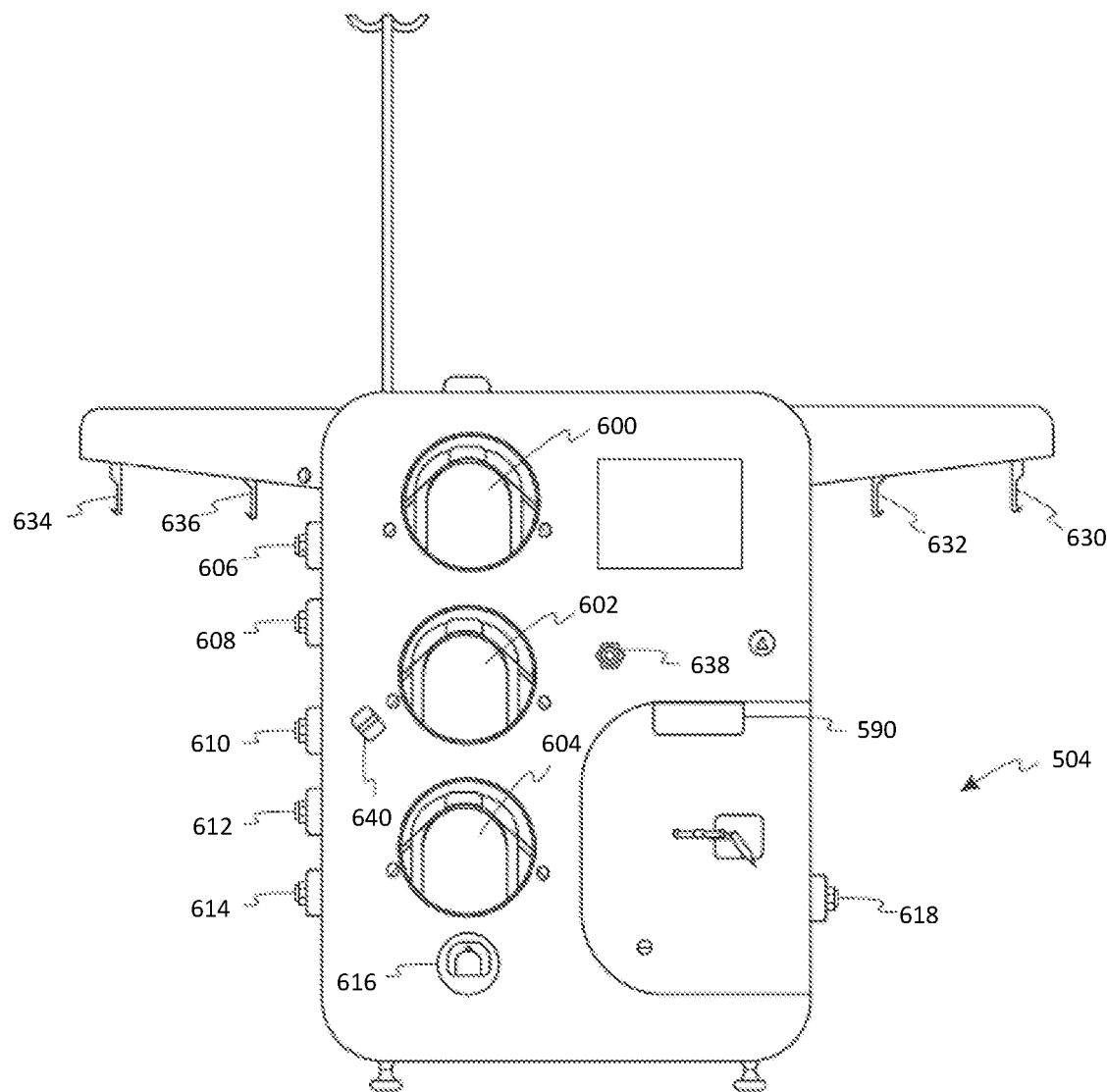
FIG. 18 is a frontal view of the reusable cell processing apparatus of FIG. 15.

In general terms, the processor 502, 504 includes a disposable fluid circuit 502 (see also FIG. 17) and reusable hardware 504 (see also FIG. 18). According to the illustrated embodiments, the disposable fluid circuit 502 includes a separator, containers of processing solutions, such as wash solutions, treating agents, or sources of biological fluid (which containers may be initially separate and then connected to the remainder of the circuit 502 at the time of processing), and tubing that connects the separator and the containers and that defines flow paths throughout the circuit and access sites for sterile or other connection to the containers. The reusable hardware 504 may include at least one drive for the separator, scales to weigh at least some of the containers and contents thereof, and pumps and clamps to receive the tubing and control the flow of fluid through the circuit 502. The pumps may operate by peristaltic action, although other types of pumps and pumping action may be used.

More particularly and with reference to FIG. 17, the at least one disposable fluid circuit 502 includes an integrated spinning membrane separator 510. The details of the spinning membrane separator are described above relative to the spinning membrane separator 112, and that description may apply to the separator 510 as well. The spinning membrane separator 510 has an inlet 512 and outlets 514, 516. The outlet 514 receives the material from the annular side of the separator 510, or retentate. The outlet 516 receives the material from the back side of the separator 510, or filtrate, which material may be considered waste from the wash (i.e., the diluted suspension medium).

The fluid circuit 502 also may include an in-process container 520, a product container 522, and a filtrate container 524, which containers may be manufactured integrally connected to the fluid circuit 502 (i.e., they do not require connection at the time of processing). Other containers, such as a source container 526 (which may itself be the product container of a different fluid circuit) and the wash containers 528, 530 (see FIG. 15, which may contain saline or other solutions), may be attached in sterile fashion to the circuit 502 by employing a sterile docking device or a spike. In the case of the container 526, the container 526 has an access site 532 that may be configured for (sterile) attachment to the fluid circuit 502 at docking site 534. In the case of the wash containers 528, 530, the containers have access sites and the fluid circuit 502 may include tubing 540, 542 which terminate in an access site, such as spike connectors 544, 546. The tubing 540, 542 may include in-line sterile barrier filters 548, 550 for filtering any particulate from the wash fluid; in one embodiment, the sterile barrier filters 548, 550 may be 0.2 μm filters.

As regards the tubing, the circuit 502 as illustrated in FIG. 17 includes three tubing segments 560, 562, 564 that are received within peristaltic pumps, and through which fluid is pumped between the separator 510 and the containers 520, 522, 524, 526, 528, 530. Fluid passes from the container 526, via the docketing sites 532, 534, along tubing 566 to a downstream branched connector 568, where it connects to the tubing 560. The container 520 is also attached via tubing 570 to the branched connector 568. Similarly, fluid passes from the containers 528, 530 along tubing 540, 542 to the tubing 562. Tubing 572 attached to the tubing 560 is connected to tubing 574 attached to the tubing 562 at a branched connector 576. The branched connector 576 also is attached to tubing 578, which, in turn, is connected to the inlet 512 of the spinning membrane separator 510.

Continuing at the outlets 514, 516 of the spinning membrane separator 510, the outlet 514 is connected to tubing 580 that is connected to the tubing 564. The tubing 564 is connected to a branched connector 582, and via further tubing that defines a flow path to the container 520 and a flow path to the container 522. The other outlet 516, which receives, for example, the diluted suspension medium, is connected to tubing 584 to container 524, which container 524 may have a connection port 586 for sampling or withdrawing the material from within the filtrate container 524. The product container 522 may also include a sampling assembly.

The containers and the plastic tubing may be made of conventional medical grade plastic that can be sterilized by sterilization techniques commonly used in the medical field such as, but not limited to, radiation or autoclaving. Plastic materials useful in the manufacture of containers and of the tubing in the circuits disclosed herein include plasticized poly(vinyl chloride). Other useful materials include acrylics. In addition, certain polyolefins may also be used.

Turning now to FIG. 18, the reusable hardware processing apparatus 504, also referred to herein as "hardware," is now described. The apparatus 504 may be of compact size suitable for placement on a table top of a lab bench and adapted for easy transport. Alternatively, apparatus 504 may be supported by a pedestal that can be wheeled to its desired location.

The apparatus includes a drive unit, or "spinner," 590 that is used to operate the spinning membrane separator 510. Spinner 590 may consist of a drive motor connected and operated by apparatus 504, coupled to turn an annular magnetic drive member including at least a pair of permanent magnets. As the annular drive member is rotated, magnetic attraction between corresponding magnets within the housing of the spinning membrane separator cause the spinner within the housing of the spinning membrane separator to rotate.

Further, the apparatus 504 also includes a plurality of peristaltic pumps 600, 602, 604, that are selectively associated with tubing 560, 562, 564 of the disposable fluid circuit 502. The peristaltic pumps 600, 602, 604 advance the cell suspension or other fluid within the disposable set 502, as will be understood by those of skill in the art. The apparatus 504 also includes clamps 606, 608, 610, 612, 614, 616, 618, which clamps may be in the form of pinch valves. The clamps 606, 608, 610, 612, 614, 616, 618 are used, in combination with the pumps 600, 602, 604 to control the flow of the cell suspension or other fluids through different segments of the disposable set 502.

The apparatus 504 also may include several sensors to measure various conditions. The output of the sensors may be utilized by device 504 to operate one or more wash or processing cycles.

For example, the apparatus may include scales 630, 632, 634, 636 from which the product (or retentate) container 522, the filtrate container 524, the source container 526, and the in-process container 520, respectively, may depend and be weighed. The weights of the bags are monitored by weight sensors and recorded during a washing or other procedure. From measurements of the weight sensors, the device determines whether each container is empty, partially full, or full and controls the components of apparatus 504, such as the peristaltic pumps 600, 602, 604 and clamps 606, 608, 610, 612, 614, 616, 618.

One or more pressure transducer sensor(s) 638 may be provided on apparatus 504 and may be associated with a disposable set 502 at certain points to monitor the pressure during a procedure. Pressure transducer 638 may be integrated into an in-line pressure monitoring site (at, for example, tubing segment 578), to monitor pressure inside separator 510. Air detector sensor 640 may also be associated with the disposable set 502, as necessary. Air detector sensor 640 is optional and may be provided to detect the location of fluid/air interfaces.

Having thus described the processor, including disposable circuit 502 and reusable hardware 504, additional details of the control unit or controller 506 are described with reference to FIG. 16. As mentioned above, the controller 506 may include a microprocessor 650 (which, in fact may include multiple physical and/or virtual processors). According to other embodiments, the controller 506 may include one or more electrical circuits designed to carry out the actions described herein. In fact, the controller 506 may include a microprocessor and other circuits or circuitry. In addition, the controller 506 may include one or more memories 652. The instructions by which the microprocessor 650 is programmed may be stored on the memory 652 associated with the microprocessor 650, which memory/memories 652 may include one or more tangible non-transitory computer readable memories, having computer executable instructions stored thereon, which when executed by the microprocessor 650, may cause the microprocessors 650 to carry out one or more actions as described below.

As is also illustrated in FIG. 16, the controller 506 may be coupled to one or more of the structures described above, for example to receive information (e.g., in the form of signals) from these structures or to provide commands (e.g., in the form of signals) to these structures to control the operation of the structures. As illustrated, the controller 506 may be coupled to the scales 630, 632, 634, 636, the sensors 638, 640 and the at least one input 654 to receive information from those devices. Additionally, the controller 506 may be coupled to the pumps 600, 602, 604, the clamps 606, 608, 610, 612, 614, 616, 618, and the drive 590 to provide commands to those devices to control their operation. It may also be possible that the controller 506 receives information from and provides commands to a given structure, such as one of the structures already mentioned. The controller 506 may be directly electrically connected to these structures to be coupled to them, or the controller 506 may be directly connected to other intermediate equipment that is directly connected to these structures to be coupled to them.

The at least one input 654 may include a number of different devices according to the embodiments described herein. For example, the input 654 could include a keyboard or keypad by which a user may provide information and/or instructions to the controller 506. Alternatively, the input 654 may be a touch screen, such as may be used in conjunction with a video display 656 that is disposed on the front panel of the device 504 (see FIG. 15), the video display 656 also being coupled to the controller 506. The input could also include a reader or scanner, such as a barcode reader or scanner or an RFID reader. The assembly of the input/touch screen 654 and video display 656 may be one of the aforementioned structures to which the controller 506 is coupled from which the controller 506 receives information and to which the controller 506 provides commands. According to still other embodiments, the input 654 may be in the form of computer equipment that permits the cell processing system including the controller 506 to communicate (whether via wires, cables, etc. or wirelessly) with other cell processing systems over a local network, or with other cell processing systems or other computer equipment (e.g., a server) over local networks, wide area networks, or the Internet. According to such an embodiment, the input may include an internal transmitter/receiver device.

Having discussed the structure of the illustrated embodiment of the fluid circuit 502 and the corresponding equipment of the reusable hardware 504, the components of the system 502 that define the priming subsystem and their operation is now discussed. It will be recognized that the priming of the fluid circuit 502 will typically be preceded by other actions (e.g., installing the fluid circuit on the reusable hardware, testing the fluid circuit in a series of "dry" checks, attaching containers to the fluid circuit, etc.), which collectively may be referred to as pre-processing actions, in that they occur before the system 502 is used to process (e.g., wash) a cell suspension. Further it will be recognized that the priming of the fluid circuit may be followed by other pre-processing actions and the processing actions that define the protocol to be carried out by the system 502.

According to this embodiment, the priming subsystem includes the spinning membrane separator 510 with inlet 512 and outlets 514, 516 (see FIG. 11), and is capable of vacuum priming the annular side of the separator 510. The priming fluid container may be defined by one or both of the containers 528, 530 which are connected to the tubing 540, 542, 562, 574, 578 to the port 512 (see FIGS. 15 and 17). The tubing 540, 542 is received in clamps 606, 608 that open or block the path or pathway between the containers 528, 530 and the inlet 512. The first pump is defined by the pump 604, but may be assisted by the pump 600 as well. The second selectable junction may be defined by clamp 618. The controller 506 operates as the controller of the vacuum priming subsystem.

The priming may start with the atmospheric/low vacuum priming of the annular side of the separator 510. To do this, the controller 506 may open clamps 606 (or 608), 614 (remainder closed) and cause the pump 604 (and potentially also pump 600 to operate. This draws wash fluid from the container 528, 530 into the inlet 512 of the spinning membrane 510. The fluid passes through the spinning membrane 510, out of the outlet 514 and through pump 604.

The priming may also include the vacuum priming of the annular side of the separator 510. To do this, controller 506 closes clamp 606 (or 608) and operates pump 604. This will draw a vacuum at the outlet 514 of the separator 510 via the channels. As mentioned previously, the entrapped air will increase in volume under vacuum, making it easier to remove. After a desired vacuum is achieved or exceeded (for example, −8 psid) as determined at the pressure sensor 638, the clamp 606 (or 608) is opened and air/fluid rapidly travels or is exhausted out of the spinning membrane assembly 510.

Thus, an improved method and system for priming a system or method for processing (e.g., concentrating or washing) biological cells has been disclosed, and in particular a method and system for vacuum priming a system or method for processing biological cells. The description provided above, and the other aspects provided below, are intended for illustrative purposes, and are not intended to limit the scope of the disclosure to any particular method, system, apparatus, or device described herein.

Other Aspects

Aspect 1. A fluid processing system including a priming subsystem for priming a spinning membrane separator, the priming subsystem comprising: a priming fluid container in which a priming fluid is disposed;

the spinning membrane separator having an inlet, a first outlet, and a second outlet;

at least a first selectable junction disposed between the priming fluid container and the inlet of the spinning membrane separator, the first selectable junction configured to open a path between the priming fluid container and the inlet or to block the path between the priming fluid container and the inlet;

a first pump coupled to the first outlet of the spinning membrane separator; at least a second selectable junction coupled to the second outlet of the spinning membrane separator; and a controller coupled to at least the first selectable junction, the first pump, and the second selectable junction, the controller configured:
- a) to open the first selectable junction to open the path,
- b) to operate the first pump to draw priming fluid from the priming fluid container into the spinning membrane separator,
- c) to close the first and second selectable junctions after priming fluid has been drawn into the spinning membrane separator,
- d) to operate the first pump after the first selectable junction is closed to draw a vacuum, and
- e) to open the first selectable junction after the vacuum has been drawn.

Aspect 2. The fluid processing system according to aspect 1, wherein b) occurs under atmospheric or low vacuum conditions.

Aspect 3. The fluid processing system according to aspect 1 or 2, further comprising at least a first pressure sensor adjacent the first outlet, the controller coupled to the first pressure sensor and configured to sense a pressure at the first outlet via the first pressure sensor and to open the first selectable junction after the pressure exceeds a pressure threshold.

Aspect 4. The fluid processing system according to any one of claims 1 to 3, further comprising a second pump coupled to the second outlet of the spinning membrane separator, and at least a third selectable junction disposed between the first outlet and the first pump, the controller configured, after e):
- f) to open the first selectable junction to open the path.
- g) to open the second selectable junction,
- h) to operate the second pump to draw priming fluid from the priming fluid container into the spinning membrane separator,
- i) to close the first and third selectable junctions after priming fluid has been drawn into the spinning membrane separator,
- j) to operate the second pump after the third selectable junction is closed to draw a vacuum, and k) to open the first selectable junction after the vacuum has been drawn.

Aspect 5. The fluid processing system according to aspect 4, wherein h) occurs under atmospheric or low vacuum conditions.

Aspect 6. The fluid processing system according to aspect 4 or 5, further comprising at least a second pressure sensor adjacent the second outlet, the controller coupled to the second pressure sensor, the controller configured to sense a pressure at the second outlet via the second pressure sensor and to open the first selectable junction after the pressure exceeds a pressure threshold.

Aspect 7. The fluid processing system according to any one of aspects 1 to 3, further comprising a disposable fluid circuit and a reusable hardware configured to accept the disposable fluid circuit, the disposable fluid circuit comprising:
the spinning membrane separator,
a first syringe, and
a flow control cassette comprising a housing containing the path and the first and second selectable junctions;
and the reusable hardware comprising:
a spinning membrane separator drive coupled to the spinning membrane separator,
a first syringe pump configured to have the first syringe coupled thereto and to move a piston within the first syringe,
a control cassette interface having at least one actuator for each of the selectable junctions, and
the controller coupled to the spinning membrane separator drive, the first syringe pump, and the control cassette interface.

Aspect 8. The fluid processing system according to aspect 7, wherein: the first syringe is attached at a first end to the fluid control cassette and the first syringe pump comprises a vacuum/pressure source attached to a second end of the first syringe, the vacuum/pressure source pumping filtered air into and out of the first syringe to move the piston in the first syringe.

Aspect 9. The fluid processing system according to any one of aspects 4 to 6, further comprising a disposable fluid circuit and a reusable hardware configured to accept the disposable fluid circuit,
the disposable fluid circuit comprising:
the spinning membrane separator,
a first syringe and a second syringe, and
a flow control cassette comprising a housing containing the path and the first, the second, and the third selectable junctions; and
the reusable hardware comprising:
a spinning membrane separator drive coupled to the spinning membrane separator,
a first syringe pump configured to have the first syringe coupled thereto and to move a piston within the first syringe and a second syringe pump configured to have the second syringe coupled thereto and to move a piston within the second syringe,
a control cassette interface having at least one actuator for each of the selectable junctions, and
the controller coupled to the spinning membrane separator drive, the first syringe pump, the second syringe pump and the control cassette interface.

Aspect 10. The fluid processing system according to aspect 9, wherein: the first syringe is attached at a first end to the fluid control cassette and the first syringe pump comprises a vacuum/pressure source attached to a second end of the first syringe, the vacuum/pressure source pumping filtered air into and out of the first syringe to move the piston in the first syringe; and the second syringe is attached at a first end to the fluid control cassette and the second syringe pump comprises a vacuum/pressure source attached to a second end of the second syringe, the vacuum/pressure source pumping filtered air into and out of the second syringe to move the piston in the second syringe.

Aspect 11. The fluid processing system according to any one of aspects 7 to 10, wherein:
each of the selectable junctions comprises at least two apertures, a first aperture of the at least two apertures in fluid communication with a first one of the channels and a second aperture of the at least two apertures in fluid communication with a second one of the channels, and a deflectable surface that covers the first aperture but not the second aperture, and the flow control cassette comprises a frame and at least one flexible side wall attached to one side of the frame, a portion of the flexible side wall defining the deflectable surface.

Aspect 12. The fluid processing system according to aspect 11, wherein the at least one actuator for the selectable junction selectively deflects the deflectable surface to cover the first aperture.

Aspect 13. The fluid processing system according to any one of aspects 1 to 3, further comprising a disposable fluid circuit and a reusable hardware configured to accept the disposable fluid circuit,
the disposable fluid circuit comprising:
the priming fluid container, a second container, and a third container;
the spinning membrane separator; and
at least a first line disposed between the priming fluid container and the inlet, a second line disposed between the first outlet and the second container, and a third line disposed between the second line and the third container, and
the reusable hardware comprising:
a spinning membrane separator drive coupled to the spinning membrane separator,
the first pump configured to receive the second line, a first clamp configured to receive the third line, and
the controller coupled to the spinning membrane separator drive, the first pump, and the first clamp.

Aspect 14. The fluid processing system according to aspect 13, wherein the first pump is a unidirectional peristaltic pump or a bidirectional peristaltic pump.

Aspect 15. The fluid processing system according to any one of aspects 1 to 14, wherein the first outlet is a retentate outlet and the second outlet is a filtrate outlet.

Aspect 16. A method for priming a spinning membrane separator, the method comprising:
a) opening a first selectable junction disposed between a priming fluid container in which priming fluid is disposed and an inlet of the spinning membrane separator to open a path between the priming fluid container and an inlet of the spinning membrane separator,
b) operating a first pump coupled to a first outlet of the spinning membrane separator to draw priming fluid from the priming fluid container into the spinning membrane separator,
c) closing the first selectable junction and a second selectable junction coupled to
a second outlet of the spinning membrane separator after priming fluid has been
drawn into the spinning membrane separator,
d) operating the first pump after the first selectable junction is closed to draw a
vacuum, and e) opening the first selectable junction after drawing the vacuum.

Aspect 17. The method according to aspect 16, wherein b) occurs under atmospheric or low vacuum conditions.

Aspect 18. The method according to aspect 16 or 17, further comprising sensing a pressure at the first outlet via a first pressure sensor, and wherein the opening of the first selectable junction occurs after the pressure exceeds a pressure threshold.

Aspect 19. The method according to any one of the aspects 16 to 18, after e):
f) opening the first selectable junction to open the path;
g) opening the second selectable junction,
h) operating a second pump coupled to the second outlet of the spinning membrane separator to draw priming fluid from the priming fluid container into the spinning membrane separator,
i) closing the first selectable junction and a third selectable junction disposed between the first outlet and the first pump after priming fluid has been drawn into the spinning membrane separator,
j) operating the second pump after the third selectable junction is closed to draw a vacuum, and
k) opening the first selectable junction after the drawing the vacuum.

Aspect 20. The method according to aspect 19, wherein h) occurs under atmospheric or low vacuum conditions.

Aspect 21. The method according to aspect 19 or 20, further comprising sensing a pressure at the second outlet via a second pressure sensor, and wherein the opening of the first selectable junction occurs after the pressure exceeds a pressure threshold.

The invention claimed is:

1. A fluid processing system including a priming subsystem for priming a spinning membrane separator, the priming subsystem comprising:
   a priming fluid container in which a priming fluid is disposed;
   the spinning membrane separator having an inlet, a first outlet, and a second outlet;
   at least a first selectable junction disposed between the priming fluid container and the inlet of the spinning membrane separator, the first selectable junction configured to open a path between the priming fluid container and the inlet or to block the path between the priming fluid container and the inlet;
   a first pump coupled to the first outlet of the spinning membrane separator;
   at least a second selectable junction coupled to the second outlet of the spinning membrane separator;
   a controller coupled to at least the first selectable junction, the first pump, and the second selectable junction, the controller configured:
      a) to open the first selectable junction to open the path,
      b) to operate the first pump to draw priming fluid from the priming fluid container into the spinning membrane separator,
      c) to close the first and second selectable junctions after priming fluid has been drawn into the spinning membrane separator,
      d) to operate the first pump after the first selectable junction is closed to draw a vacuum, and
      e) to open the first selectable junction after the vacuum has been drawn;
   a disposable fluid circuit and a reusable hardware configured to accept the disposable fluid circuit,
   the disposable fluid circuit comprising:
      the spinning membrane separator,
      a first syringe, and
      a flow control cassette comprising a housing containing the path and the first and second selectable junctions;
         wherein each of the selectable junctions comprises at least two apertures, a first aperture of the at least two apertures in fluid communication with a first channel and a second aperture of the at least two apertures in fluid communication with a second channel, and a deflectable surface that covers the first aperture but not the second aperture, and
         the flow control cassette comprises a frame and at least one flexible side wall attached to one side of the frame, a portion of the flexible side wall defining the deflectable surface; and
   the reusable hardware comprising:
      a spinning membrane separator drive coupled to the spinning membrane separator,
      a first syringe pump configured to have the first syringe coupled thereto and to move a piston within the first syringe,
      a control cassette interface having at least one actuator for each of the selectable junctions, and
      the controller coupled to the spinning membrane separator drive, the first syringe pump, and the control cassette interface.

2. The fluid processing system according to claim 1, wherein b) occurs under atmospheric or low vacuum conditions.

3. The fluid processing system according to claim 1, further comprising at least a first pressure sensor adjacent the first outlet, the controller coupled to the first pressure sensor and configured to sense a pressure at the first outlet via the first pressure sensor and to open the first selectable junction after the pressure exceeds a pressure threshold.

4. The fluid processing system according to claim 1, further comprising a second pump coupled to the second outlet of the spinning membrane separator, and at least a third selectable junction disposed between the first outlet and the first pump, the controller configured, after e):
   f) to open the first selectable junction to open the path
   g) to open the second selectable junction,
   h) to operate the second pump to draw priming fluid from the priming fluid container into the spinning membrane separator,
   i) to close the first and third selectable junctions after priming fluid has been drawn into the spinning membrane separator,
   j) to operate the second pump after the third selectable junction is closed to draw a vacuum, and
   k) to open the first selectable junction after the vacuum has been drawn.

5. The fluid processing system according to claim 4, wherein h) occurs under atmospheric or low vacuum conditions.

6. The fluid processing system according to claim 4, further comprising at least a second pressure sensor adjacent the second outlet, the controller coupled to the second pressure sensor, the controller configured to sense a pressure at the second outlet via the second pressure sensor and to open the first selectable junction after the pressure exceeds a pressure threshold.

7. The fluid processing system according to claim 1, wherein:
   the first syringe is attached at a first end to the fluid control cassette and the first syringe pump comprises a vacuum/pressure source attached to a second end of the first syringe, the vacuum/pressure source pumping filtered air into and out of the first syringe to move the piston in the first syringe.

8. The fluid processing system according to claim 4, wherein,
the disposable fluid circuit further comprises:
a second syringe, and
a flow control cassette comprising a housing containing the path and the first, the second, and the third selectable junctions; and
the reusable hardware comprising further comprises:
a second syringe pump configured to have the second syringe coupled thereto and to move a piston within the second syringe, and
the controller further coupled to the second syringe pump.

9. The fluid processing system according to claim 8, wherein:
the first syringe is attached at a first end to the fluid control cassette and the first syringe pump comprises a vacuum/pressure source attached to a second end of the first syringe, the vacuum/pressure source pumping filtered air into and out of the first syringe to move the piston in the first syringe; and
the second syringe is attached at a first end to the fluid control cassette and the second syringe pump comprises a vacuum/pressure source attached to a second end of the second syringe, the vacuum/pressure source pumping filtered air into and out of the second syringe to move the piston in the second syringe.

10. The fluid processing system according to claim 1, wherein the at least one actuator for the selectable junction selectively deflects the deflectable surface to cover the first aperture.

11. The fluid processing system according to claim 1, wherein the disposable fluid
further comprises:
the priming fluid container, a second container, and a third container;
at least a first line disposed between the priming fluid container and the inlet, a second line disposed between the first outlet and the second container, and a third line disposed between the second line and the third container, and
the reusable hardware comprising further comprises:
the first pump configured to receive the second line,
a first clamp configured to receive the third line, and
the controller coupled to the spinning membrane separator drive, the first pump, and the first clamp.

12. The fluid processing system according to claim 11, wherein the first pump is a unidirectional peristaltic pump or a bidirectional peristaltic pump.

13. The fluid processing system according to claim 1, wherein the first outlet is a retentate outlet and the second outlet is a filtrate outlet.

* * * * *